(12) United States Patent
Erskine

(10) Patent No.: US 12,480,815 B2
(45) Date of Patent: Nov. 25, 2025

(54) SPECTROGRAPH STABILIZATION USING A SINGLE-DELAY INTERFEROMETER

(71) Applicant: Lawrence Livermore National Security, LLC, Livermore, CA (US)

(72) Inventor: David J. Erskine, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 442 days.

(21) Appl. No.: 18/066,899

(22) Filed: Dec. 15, 2022

(65) Prior Publication Data
US 2024/0201014 A1 Jun. 20, 2024

(51) Int. Cl.
*G01J 3/45* (2006.01)
*G01J 3/28* (2006.01)
*G01J 9/02* (2006.01)

(52) U.S. Cl.
CPC .......... *G01J 3/45* (2013.01); *G01J 2003/283* (2013.01); *G01J 2003/451* (2013.01); *G01J 2009/0234* (2013.01)

(58) Field of Classification Search
CPC .. G01J 3/45; G01J 2003/283; G01J 2003/451; G01J 2009/0234
See application file for complete search history.

(56) References Cited

U.S. PATENT DOCUMENTS

| | | | | | |
|---|---|---|---|---|---|
| 5,018,862 | A * | 5/1991 | Aiello | ................ | G01B 9/02081 356/450 |
| 5,059,027 | A * | 10/1991 | Roesler | ................... | G01J 3/453 356/456 |
| 5,585,921 | A * | 12/1996 | Pepper | ................ | G01N 29/075 356/432 |
| 6,351,307 | B1 | 2/2002 | Erskine | | |
| 6,788,420 | B1 * | 9/2004 | Dubovitsky | ......... | G01B 9/0201 356/487 |
| 2006/0061770 | A1 * | 3/2006 | Erskine | ..................... | G01J 3/10 356/484 |
| 2008/0221814 | A1 * | 9/2008 | Trainer | ................ | G01N 15/042 702/70 |
| 2012/0229817 | A1 * | 9/2012 | Goodwin | ............ | G03F 7/70775 359/287 |
| 2015/0241280 | A1 * | 8/2015 | Lenzner | ................ | G01J 3/1804 356/451 |
| 2015/0338202 | A1 * | 11/2015 | Xiang | ...................... | G01B 9/02 356/477 |

OTHER PUBLICATIONS

A. G. Kim, E. V. Linder, J. Edelstein, and D. Erskine, "Giving cosmic redshift drift a whirl," Astroparticle Physics 62, 195-205 (2015), arXiv:1402.6614.

(Continued)

*Primary Examiner* — Arleen M Vazquez
*Assistant Examiner* — Lyudmila Zaykova-Feldman
(74) *Attorney, Agent, or Firm* — Perkins Coie LLP

(57) ABSTRACT

Methods, systems and devices are described that improve optical spectroscopic techniques and particularly those that involve externally dispersed interferometer (EDI) techniques that result in an output spectrum having improved stability characteristics. The output spectrum minimizes the unwanted shifts in wavelength when the spectrograph component of the EDI instrument is under stresses that would otherwise shift or distort the wavelength positions of the spectrum.

24 Claims, 21 Drawing Sheets

(56) References Cited

OTHER PUBLICATIONS

B. A. Macintosh, et al., "The Gemini Planet Imager: from science to design to construction," in Adaptive Optics Systems, Proc. SPIE, vol. 7015 (2008) p. 701518.
B. Ma, et al., "Very Low-Mass Stellar and Substellar Companions to Solar-Like Stars From Marvels. VI. a Giant Planet and a Brown Dwarf Candidate in a Close Binary System HD 87646," Astronomical Journal 152, 112 (2016).
D. A. Fischer, G. Anglada-Escude, P. Arriagada, et al., "State of the Field: Extreme Precision Radial Velocities," Proc. Astr. Soc. Pacific 128, 066001 (2016).
D. Erskine, E. Linder, A. Kim, et al., "Direct Acceleration: Cosmic and Exoplanet Synergies," arXiv 1903.05656 (2019), arXiv:1903.05656 [astro-ph.IM].
D. J. Erskine and E. V. Linder, "A 1000x Stabler Spectrograph using an Interferometer with Crossfaded Delays," in American Astronomical Society Meeting Abstracts #234, vol. 234 (2019) p. 103.01.
D. J. Erskine, "An Externally Dispersed Interferometer Prototype for Sensitive Radial Velocimetry: Theory and Demonstration on Sunlight," PASP 115, 255-269 (2003).
D. J. Erskine, "Dispersed interferometers," in the WSPC Handbook of Astronomical Instrumentation, vol. vol. 3, edited by D. N. Burrows and A. M. Moore (World Scientific Publishing Company, Singapore, 2020).
D. J. Erskine, "Method for boosting dispersive spectrograph stability 1000x using interferometry with crossfaded pairs of delays," Journal of Astronomical Telescopes, Instruments, and Systems 7, 025006 (2021).
D. J. Erskine, et al, "Novel Interferometer Spectrometer for Sensitive Stellar Radial Velocimetry," Imaging the Universe in Three Dimensions: Astrphys. Advncd. Multi-Wavel. Imaging Devices, ASP Conf. Series, vol. 195, p. 501-507, 2000.
D. J. Erskine, et al., "Enhanced exoplanet biosignature detection from an interferometer addition to low resolution spectrographs," in Ground-based and Airborne Instrumentation for Astronomy VII, Proc. SPIE, vol. 10702 (2018) p. 161.
D. J. Erskine, et al., "High-resolution broadband spectroscopy using externally dispersed interferometry at the Hale telescope: part 1, data analysis and results," Journal of Astronomical Telescopes, Instruments, and Systems 2, 025004 (2016).
D. J. Erskine, et al., "High-resolution broadband spectroscopy using externally dispersed interferometry at the Hale telescope: part 2, photon noise theory," Journal of Astronomical Telescopes, Instruments, and Systems 2, 045001 (2016).
D. J. Erskine, J. Edelstein, W. M. Feuerstein, and B. Welsh, "High-Resolution Broadband Spectroscopy Using an Externally Dispersed Interferometer," ApJ 592, L103-L106 (2003).
David J. Erskine, et al., "Spectrograph Stabilization of 500x using a Single-delay Interferometer," SPIE Astron. Tele. Instrum., Montreal, Canada, Jul. 17-22, 2022.
F. Kerber, G. Nave, and C. J. Sansonetti, "The Spectrum of Th—Ar Hollow Cathode Lamps in the 691-5804 nm region: Establishing Wavelength Standards for the Calibration of Infrared Spectrographs," ApJS 178, 374-381 (2008).
H. G. Roe, "Titan's atmosphere at high resolution," Publications of the Astronomical Society of the Pacific 115, 1262 (2003).
J. Edelstein and D. J. Erskine, "High resolution absorption spectroscopy using externally dispersed interferometry," in UV, X-Ray, and Gamma-Ray Space Instrumentation for Astronomy XIV, O. H. W. Siegmund, Ed., Proc. SPIE 5898, 297-307 (2005).
J. Ge, D. J. Erskine, and M. Rushford, "An Externally Dispersed Interferometer for Sensitive Doppler Extrasolar Planet Searches," PASP 114, 1016-1028 (2002).
J. Ge, et al., "The first extrasolar planet discovered with a new-generation high-throughput Doppler instrument," ApJ 648, 683-695 (2006), astro-ph/0605247.
P. S. Muirhead, et al., "Precise Stellar Radial Velocities of an M Dwarf with a Michelson Interferometer and a Medium-Resolution Near-Infrared Spectrograph," PASP 123, 709 (2011).
S. G. Wolff, et al., "Gemini planet imager observational calibration XIII: wavelength calibration improvements, stability, and nonlinearity," Ground-based & Airborne Instrumentation for Astronomy VI, Proc. SPIE, vol. 9908 p. 990838, 2016.
David J. Erskine, et al., "Externally Dispersed Interferometer Testbed Diagnosing Keck Planet Finder Spectrograph High Resolution Performance," SPIE Astron. Tele. Instr. Session 105 Jul. 17-22, 2022, Montreal, Canada.

\* cited by examiner

SPECTROGRAPH STABILIZATION USING A SINGLE-DELAY INTERFEROMETER

STATEMENT REGARDING FEDERALLY SPONSORED RESEARCH

This invention was made with Government support under Contract No. DE-AC52-07NA27344 awarded by the United States Department of Energy. The Government has certain rights in the invention.

TECHNICAL FIELD

The technology in this patent document relates to interferometry and more specifically to externally dispersed interferometric systems and methods.

BACKGROUND

Spectrographs are used to measure wavelengths of light in many fields of science and engineering, medicine and remote sensing. For portable applications, such as on an airborne platform, it is advantageous for the spectrograph to be: (1) compact and lightweight while still providing the needed spectral resolution, and (2) robust to environmental stresses that would cause wavelength drifts, such as vibration, acceleration, barometric and thermal changes—meaning it is stable or robust.

Conventional astronomical high-resolution spectrographs are often bulky (e.g., several tons) and large (e.g., size of a room) that would not fit in a small airborne vehicle. Additionally, concrete and steel are normally needed to keep the large optics in rigid configuration to within a tolerance of less than a wavelength of light. Even if such assemblies could be placed inside of an aircraft, the accelerations and thermal changes encountered by airborne platforms would ruin the wavelength precision of the instrument. Therefore, there is a need for compact and high-resolution spectrographs.

SUMMARY

The disclosed embodiments, among other features and benefits, relate to improvements to the optical spectroscopic techniques and particularly to those that involve externally dispersed interferometer (EDI) techniques, as well as improvements to the data processing aspects of EDI that result in an output spectrum having improved stability characteristics. The improvements include producing an output spectrum that minimizes the unwanted shift in wavelength when the spectrograph component of the EDI instrument is under stresses that would otherwise shift or distort the wavelength positions of the spectrum.

One aspect of the disclosed embodiments relates to a method for obtaining spectral characteristics of an optical signal that includes receiving information representing measured optical signals produced by an externally dispersed interferometer, determining a nonfringing component from the received information, and obtaining an adjusted fringing component from the received information. The latter operation includes determining a fringing component from the received information (where the fringing component is bandlimited to within a range of spatial frequencies), upshifting frequencies of the fringing component to reverse the interferometer heterodyning, removing spatial frequency components in an upper section of the range of spatial frequencies of the fringing component, and adjusting magnitudes of spatial frequency components in a lower section of the range of special frequencies of the fringing component based on one or more weights to obtain the adjusted fringing component. The method further includes combining the nonfringing component with the adjusted fringing component to produce a combined output spectrum, and performing an equalization operation to modify a shape of the combined output spectrum.

DETAILED DESCRIPTION

Figure 1:
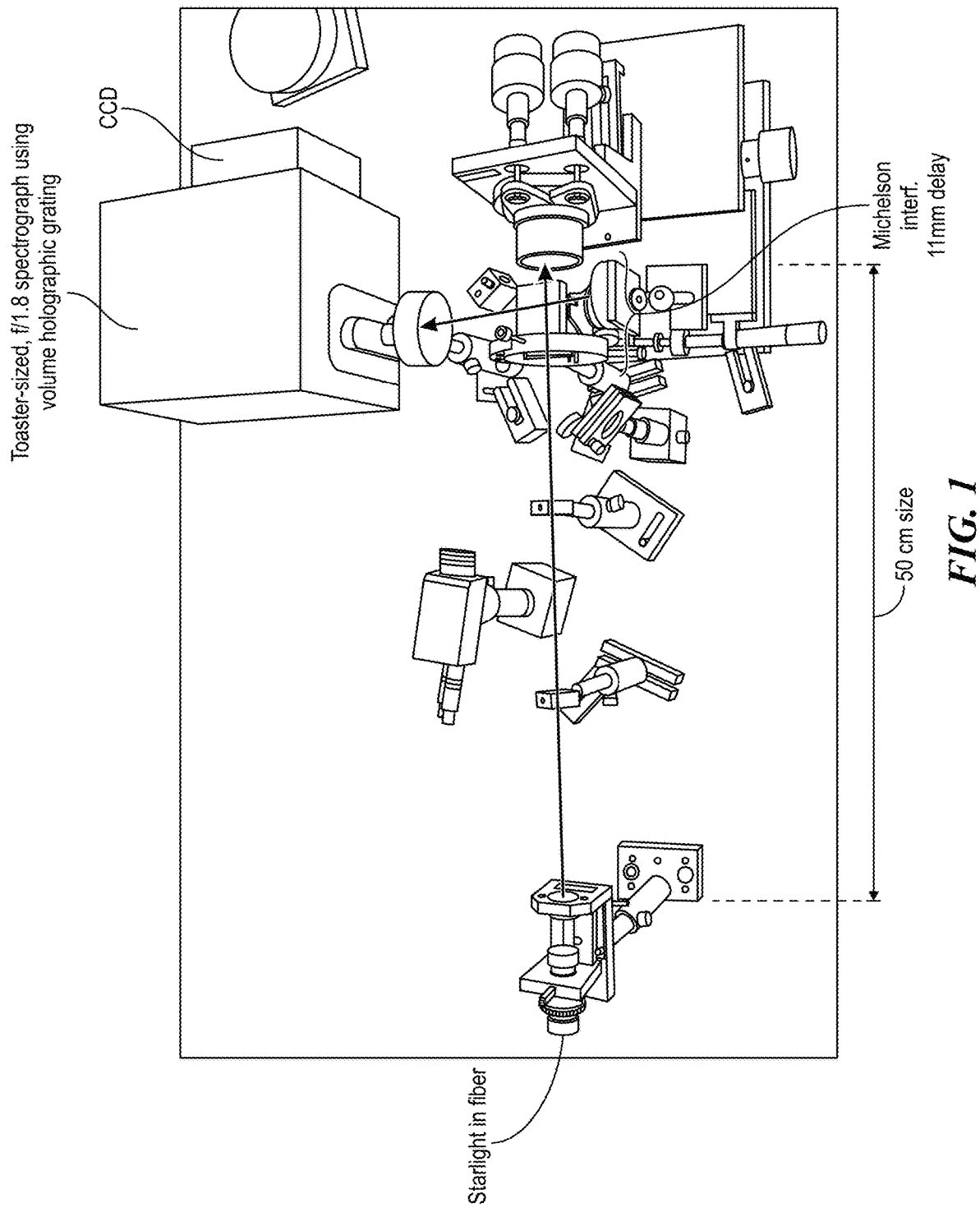
FIG. 1 illustrates an EDI benchtop system in accordance with an example embodiment.

The disclosed embodiments, among other features and benefits, relate to improved methods and devices for stabilizing an optical dispersive spectrograph against wavelength drifts, using a single-delay interferometer in series with it, and using methods of processing the data. The disclosed methods and systems have practical advantages over prior systems that use pairs of delays in the interferometer, since a single-delay interferometer is simpler to construct and operate.

As context, dispersive spectrographs, using prisms or diffraction gratings to spread input light into a spectrum, assume that a position on a detector is directly related to the wavelength $\lambda$ (or wavenumber $v=1/\lambda$, in $cm^{-1}$ units) of the input light. This is only accurate when the instrument structure is sufficiently rigid to keep the spectrograph focal spot (for a given wavelength) on the detector stationary, and not change its position relative to the detector with time along the dispersion direction.

We generally refer to any unwanted change (offset or drift) along the dispersion direction as an "insult" ($\Delta x$), and this could be in units of wavelength ($\lambda$), wavenumber (v), or pixels, for example. Many environmental effects can create a drift insult $\Delta x$. These include, but are limited to, changing air pressure, temperature, mechanical vibration, acceleration of the platform (if on an airborne or space-borne platform), change in gravity vector (if mounted on a telescope that changes its pointing), air convection. Drifts can also be created by the irregularities in the placement of pixels on the detector during manufacture. It cannot be assumed that every pixel is spaced exactly evenly in position.

As noted earlier, conventional mitigations designed to reduce $\Delta x$ can result in bulky, expensive and impractical systems. For example, some systems use heavy vacuum tanks, bulky thermal blankets and extreme temperature control, heavy metal or concrete reinforcement in the structure, and fiberoptic scrambling. While there have been attempts to produce dispersive spectrographs that are portable and low cost, the design of such systems requires engineering tradeoffs that result in lack of stability.

As an example of the tight tolerance of rigidity needed, one can consider the scenario where a spectrograph is used for astronomical use to search for exoplanets via the Doppler effect. In such applications, to detect an Earth-like planet having 10 cm/s amplitude Doppler velocity signature, the drift should be less than about 3 cm/s. For typical high resolution astronomical spectrographs, this corresponds to a rigidity of $10^{-5}$ pixel, which is extremely challenging. Even when conventional mitigations reduce the amount of drift by several orders of magnitude, it can still be much larger than $10^{-5}$. In addition, manufacturing errors that create positional non-uniformity of detector pixels may be much larger than $10^{-5}$ of a pixel.

One strategy that is leveraged in the disclosed embodiments, is to reduce the "reaction" or sensitivity to whatever insult $\Delta x$ that is present (e.g., escapes the conventional mitigations). Using the disclosed crossfading externally dispersed interferometry (crossfading EDI) techniques, a final wavelength error that is a fraction of $\Delta x$ can be achieved as compared to conventional spectrographs, which have a one-to-one relationship between the final wavelength error in the output and the environmental insult $\Delta x$.

In attempts to achieve these goals, some prior EDI systems utilize pairs of delays to stabilize the output spectrum, where each delay pair overlaps in frequency (i.e., the spatial frequency along the output spectrum). The two delay signal components are combined using strategically chosen weights in a data analysis method called "crossfading." One of the disadvantages of this technique is that two or more delays must be applied sequentially, which means the two delays are not applied to the "same" input data, making the processing of the data complicated and susceptible to errors.

The disclosed embodiments, among many other features and benefits, improve the prior systems by using a single-delay crossfading EDI technique that is modified to carry out crossfading between the native spectrograph response and the single delay response. The single-delay method allows a simpler apparatus and operation; it further allows re-analysis of older data already taken with a single delay. As will be described in further detail below, another advantage of the disclosed techniques is that the single-delay method automatically satisfies the crossfading requirement that the drift insult be the same for both delays of the pair, since the "native" component and the "fringing" component (the single delay response) are embedded simultaneously in the same recorded data set, resulting in improved output spectrum with improved stability characteristics.

As noted earlier, for portable applications, it is advantageous for a spectrograph to be: (1) compact and lightweight while still providing the needed spectral resolution, and (2) robust to environmental stresses. The disclosed embodiments that utilize crossfading externally dispersed interferometry solve both of these problems, while utilizing a cheaper and operationally simpler instrument that produces improved spectral measurements and analysis results compared to prior systems.

Regarding compactness: Resolution boosting of 2× to 10× has been demonstrated by EDI, whereby the effective resolution of the EDI system is several times greater than the spectrograph used alone. This can be used to reduce the size of the native spectrograph to achieve the same final resolution goal, thereby making the net instrument more compact, since the interferometer is usually much smaller than the spectrograph. Since conventional spectrograph length scales with its resolution, and volume and weight by higher powers of length, this 2× to 10× boost allows reduction of volume and weight by perhaps 8× to 1000×.

Regarding stability: The method of crossfading EDI can enhance the robustness of the instrument to unwanted wavelength drifts by factors of up to about 1000×.

FIG. 1 illustrates an EDI benchtop system in accordance with an example embodiment. Light from the object (e.g., starlight) enters the system from left, is directed to the interferometer section (e.g., a Michaelson interferometer with a single delay), then to the spectrograph, which can be a very compact (toaster sized) holographic grating spectrograph. The dimensions of the depicted system are less than 60 cm on each side.

Accordingly, with abilities of boosting both the resolution and stability, the EDI methods and devices disclosed herein allow a high resolution but compact dispersive-spectrograph system to fit in a small airborne platform and be resistant to vibration, thermal and barometric insults. Having both abilities is necessary to utilize high spectral resolution; the instrument drift also has to be sufficiently small relative to this resolution, so that it does not spoil the wavelength or wavenumber determination of a spectral feature, which is the main purpose of using a spectrograph.

Figure 2A:
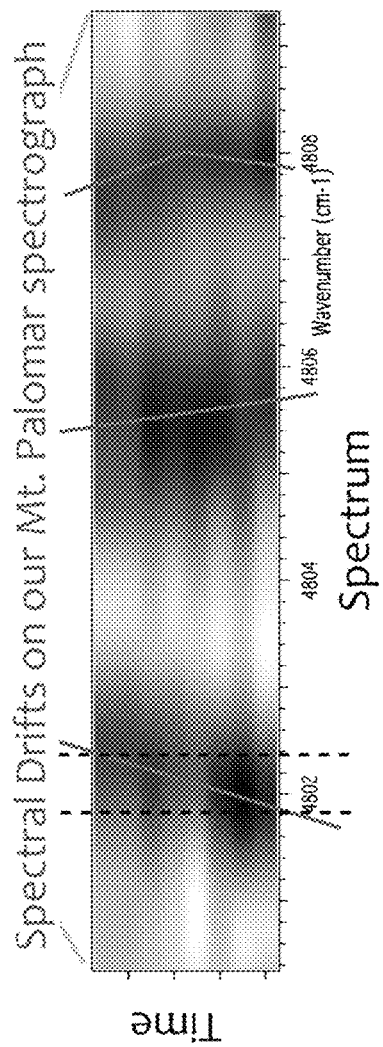
FIGS. 2A and 2B illustrate real-world examples of drifts obtained at Mt. Palomar observatory.
Figure 2B:
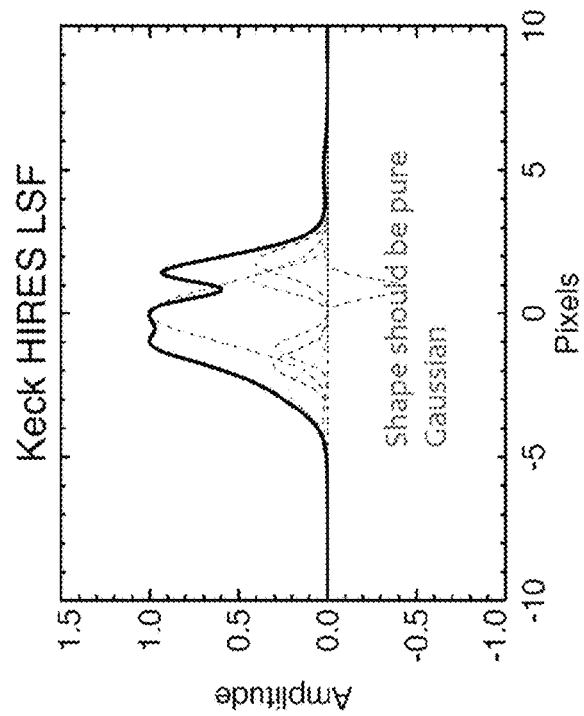

FIGS. 2A and 2B illustrate real-world examples of drifts obtained at Mt. Palomar observatory. FIG. 2A is a plot of time vs. spectrum where the peaks in the spectrum (darker areas) are shifted as a function of time (each row is a spectra taken at a different time). The solid lines are drawn to illustrate three types of peak (or wavenumber) shifts as a function of time: to higher wavenumbers (left), to lower wavenumbers (middle), and a bipolar or irregular shift (right). Because the drifts can be irregular and bipolar, with some sections drifting to the right and some to the left, it is not possible to correct the shifts during processing with a simple uniform translation of the data.

FIG. 2B is illustrates how the spectrograph focal spot for an isolated wavelength at the Keck Observatory fluctuated over time, most likely due to air convection. This peak should be a symmetric peak, usually of Gaussian shape (middle dashed curve), not having the side lobes that were actually seen in fluctuations during the time exposure (other dashed curves).

The disclosed single-delay crossfaded EDI system can indeed stabilize an irregular bipolar drift. This is demonstrated by FIG. 3, where the data in the upper plot illustrates synthetic data designed to simulate irregular bipolar drift and the lower plot illustrates the result obtained by applying the disclosed single-delay crossfading techniques. In this figure, vertical axis corresponds to time and each row corresponds to a different measurement of the same stellar spectrum, but with a time changing distortion. The parallelism of the features in the lower plot indicates successful correction. This demonstration is remarkable because it corrects the most difficult type of insult, one not correctable by a uniform translation of the data, and one seen in real-world applications.

Before discussing further details of the disclosed embodiments, it should be noted that in this document, we like to measure the position along the dispersion axis with a variable called wavenumber $v=1/\lambda$ rather than wavelength $\lambda$ because we are working with interferometers, and interferometers produce almost perfectly periodic sinusoidal transmission (T) when plotted versus v.

$$T(v)=1+\cos 2\pi\tau v \quad (1)$$

In Equation (1), the path length difference between the two interferometer arms is called the delay $\tau$, in units of distance in cm. The frequency of this periodicity, in features per wavenumber, is called $\rho$, and it is set by $\tau$. Since features per wavenumber is the same as features per 1/cm, which is the same as cm, the frequency and delay have the same units of cm. Hence, we often interchangeably refer to frequency in units of cm, or in features per 1/cm. This also means that variables $\rho$ and v are a Fourier Transform pair. So, when we plot the focal spot shape along the dispersion axis, it is called a point spread function (PSF) and we like to plot it versus $cm^{-1}$ (which you can imagine could also be plotted versus pixels or wavelength). If we plot if versus $cm^{-1}$, then when we take the Fourier transform of it to produce what is called the Modulation Transfer Function (MTF), the variable of the MTF is $\rho$, called frequency, and in units of features per $cm^{-1}$, or in delay units cm. The MTF is an engineer's way of describing how much of signal passes through a system, based on each frequency component of the system. In most systems, high frequencies are attenuated or do not pass through the system as well as low frequencies. Hence, the MTF versus $\rho$ is usually a peak, which one can approximate as Gaussian in shape. The width of the MTF is inversely related to the width of the PSF, in an uncertainty principle kind of relationship (which is because they are Fourier transforms of each other). We also call the PSF the "instrument response" when plotted in dispersion space, and we call the MTF the instrument response when plotted versus frequency.

Figure 4A:
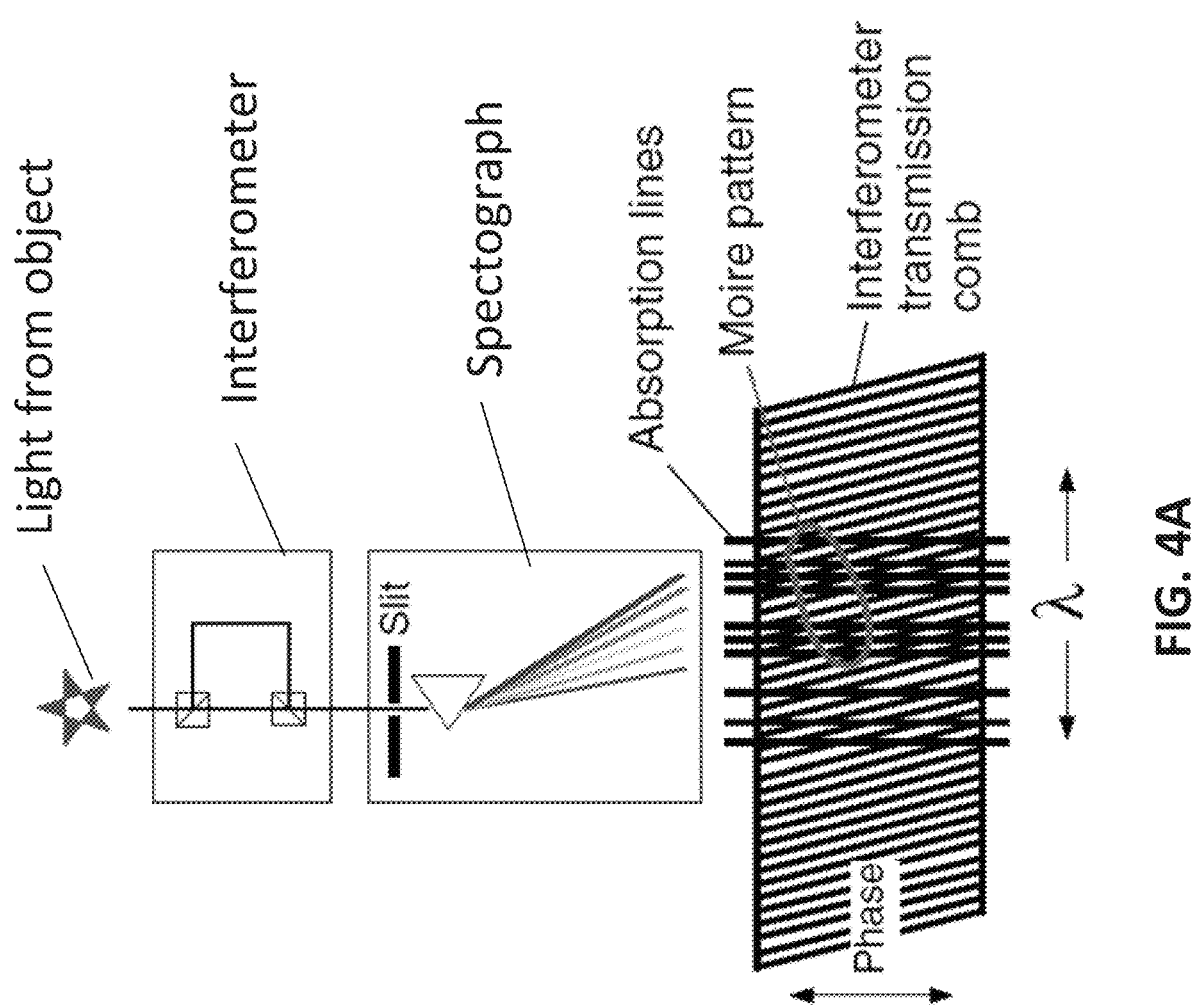
FIG. 4A illustrates an example EDI system in accordance with an example embodiment.
Figure 4B:
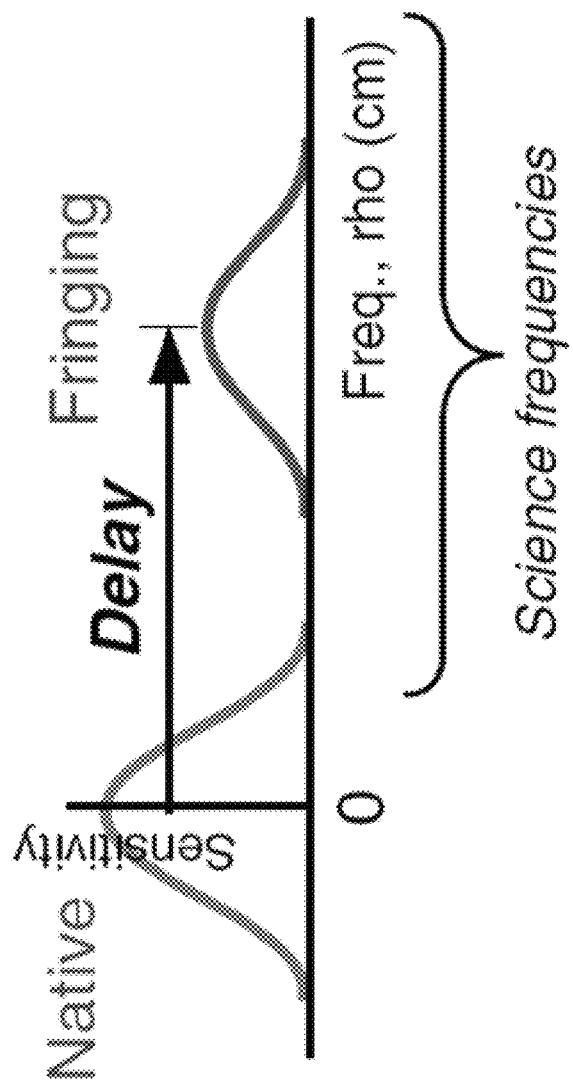
FIG. 4B illustrates the frequency response of the EDI system of FIG. 4A.

FIG. 4A illustrates an EDI system in accordance with an example embodiment that operates using a single delay. The example system is referred to as an externally dispersed interferometer (EDI), which includes an interferometer (e.g., a Michelson interferometer) in series with a spectrograph. The interferometer has a fixed but customizable delay (e.g., delay=1, 2, 3, ..., 5, ... cm), and receives light from the object (e.g., starlight). The spectrograph can be a grating spectrograph that receives the output of the interferometer and produces a spectrally dispersed output. FIG. 4B illustrates the frequency response of the EDI system that includes a first peak corresponding to the native spectrograph response (left) and a second peak (right) that has the same shape as the native response but is shifted toward higher frequencies by the amount of the interferometer delay. This is also sometimes referred to as the "fringing" component, and the native response is sometimes referred to as the "nonfringing" or native component in this patent document. The shift of the fringing component is due to a heterodyning effect created by multiplication of the sinusoidal interferometer transmission function, of form (1+cos) versus wavenumber, times the input spectrum, S. This creates upshifted and downshifted frequency components, as well as a native spectrum component with no frequency shift. The upshifted component is discarded by the phase stepping math, but the downshifted component is the important one and forms the low frequency signals we call moiré. The moirés are the bead like patterns seen in the EDI scheme graphic.

The raw fringing spectra data consists of exposures at three or more different interferometer phases, and are called "phase stepped" data. The different phases are created by very slightly incrementing or decrementing the interferometer delay, typically by a fraction of a wavelength. Ideally, the stepped phases are evenly distributed around the phase circle, where one wavelength of delay increment corresponds to a full cycle (360 degrees or 1 fringe) of phase change. A quarter wavelength delay change is convenient for analysis and discussion since it creates a 90-degree phase change, which produces simplified equations. Since the delay increment is microscopic and very much smaller than the macroscopic baseline value of the delay (which can be hundreds or thousands of wavelengths), one can still call this to a single delay, since in contrast, saying the instrument has a multiple delay denotes having delay values that differ by a macroscopic amount which is much larger.

Phase-stepping can be accomplished, for example, by mounting an interferometer cavity mirror on a piezoelectric transducer (PZT) which changes its position (in a piston manner) a fraction of a wavelength in proportion to an applied electric voltage. In this case, the several phase stepped exposures are taken in a time sequence, and the spectrum being measured is assumed to be approximately constant in wavelength character during this time sequence. In another example method of phase stepping, a single exposure can capture all the necessary phases at once. This is useful to measure spectra that could change more rapidly than the ability to time sequence exposures. This is accomplished by slightly tilting an interferometer mirror or beamsplitter so that the interferometer phase (delay) varies slightly across the detector transverse to the dispersion direction, so that each row records a spectrum along its many pixels, and at least about one cycle (360 degrees) of phase change occurs across the different rows.

We can extract two types of signal components from the same phase stepped data set: the ordinary (nonfringing) spectrum, and the fringing spectrum. Adding phase stepped exposures cancels the fringes yielding the ordinary native spectrum. Subtracting various phase stepped exposures cancels the nonfringing spectrum yielding the fringing component. Consider that adding several raw exposures will cause the fringes to cancel and leave isolated the nonfringing component. Conversely, subtracting several exposures will cancel the nonfringing component isolating the fringing component. The latter is expressed as a complex value having magnitude and phase since it describes a sinusoidal fringe. Hence, because the interferometer transmission function contains both a 1 and a cos, the two outputs, nonfringing and fringing, both are obtained simultaneously from the data.

Notably, both the nonfringing and fringing components suffer exactly the same insult drift $\Delta x$, and for all time scales. This includes those drifts, such as air convection, that are faster than the ability of a sequential delay multiple delay EDI apparatus to change its delays. This simultaneity is a requirement for optimal crossfading cancellation of the drift $\Delta x$, when combining two opposing signal components, either when two delays are used as in the prior systems, or with a single delay and the native spectrum as disclosed herein. Without this simultaneity requirement, it would be difficult to calculate the optimal weights to create the cancellation, since the value and time dependence of $\Delta x$ is assumed to be unknown (although for slow time scale insults, such as thermal drifts, a local linearity with time could be assumed).

Hence a single delay EDI has the above important practical advantage over sequentially changing multiple delay EDI. Other practical advantages include that every EDI is born as a single delay device and are more common than multiple delay EDIs, which are more complicated to build. Thirdly, it is possible to re-analyze some older single delay EDI data with the new crossfading process, to retroactively improve the accuracy of the output, provided there is some frequency overlap between the fringing peak and the native response (which depends on the delay value relative to the native spectral resolution).

Example single-delay EDI systems were illustrated in FIGS. 1 and 4A. In some embodiments, the EDI interferometer is brought to, and placed in series with, an existing facility spectrograph, one which is not portable and which the facility owner desires to improve its stability (and spectral resolution). This could be, for example, an existing spectrograph at an astronomical observatory, which suffers from wavelength drifts due to thermal and barometric pressure changes. Often observatory facility spectrographs are large, built into concrete and steel mountings, and obviously not portable, or perhaps too expensive to retro-actively put into a vacuum tank or insulate to regulate their temperature to a high tolerance. In these situations, a crossfading EDI could be brought to the existing facility and placed into the beam between the telescope output and the entrance slit of the spectrograph.

Figure 5:
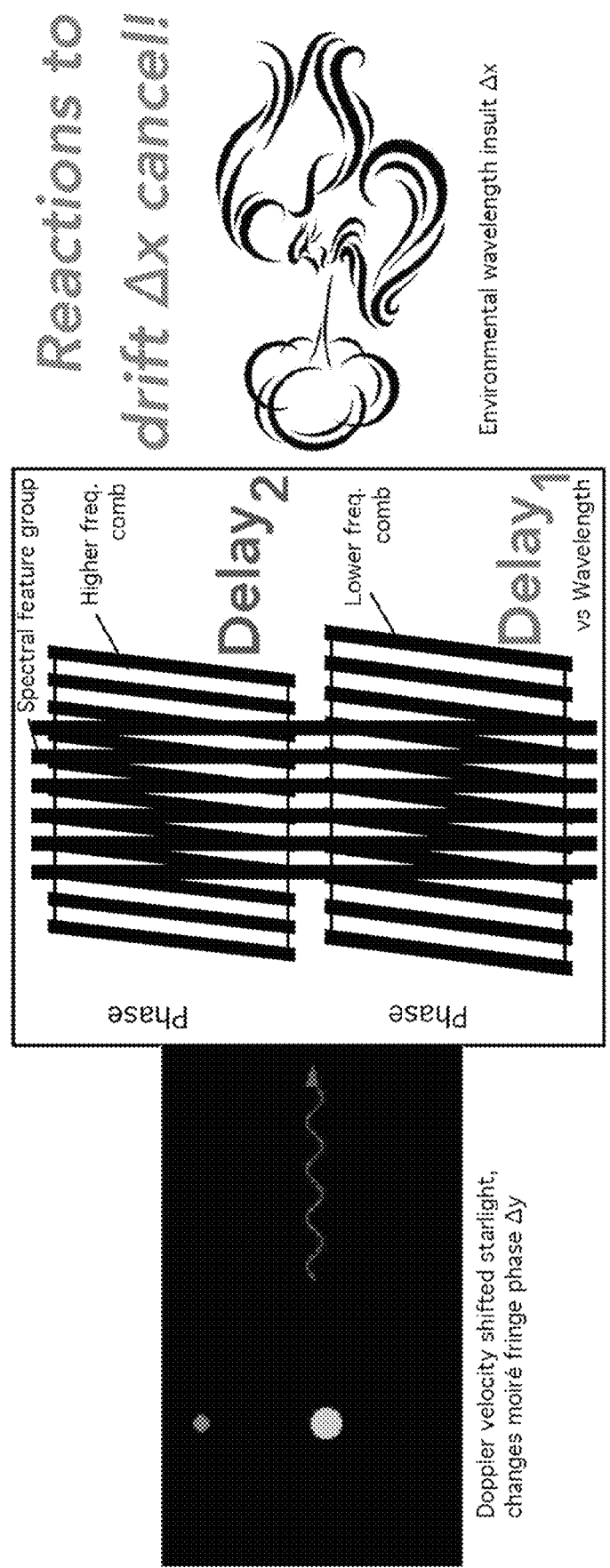
FIG. 5 illustrates an EDI system's reactions to an insult for a case where two interferometer delays are used.

In order the facilitate the understanding of the underlying principles, it is instructive to understand why having two delays that creates overlapping spectral responses can stabilize against drift (i.e., how crossfading between two delays can cancel an insult $\Delta x$). Understanding how two delays crossfade, will help the reader understand single-delay crossfading, by substituting the native spectrograph response for the lower frequency $Delay_1$. To this end, FIG. 5 illustrates light from a distant star reaching the EDI system and creating two moiré patterns that are produced at the two frequency combs (the top comb having a higher frequency compared to the lower comb). The moiré patterns have different slopes vs. wavelength, and hence cancel phase errors, in a two-delay crossfading scheme. The left side of FIG. 5 is a graphic representing a planet (smaller circle) orbiting a star (larger circle) creating a Doppler shift on the starlight. The starlight then travels to the right to be measured, and the slight Doppler shift in the wavelength causes the phase of the moiré patterns in center of illustration to change vertically (because the starlight shifts wavelength relative to the stationary interferometer comb). In this diagram phase is plotted transverse to the dispersion axis. To make the moiré more obvious a group of lines ("spectral feature group") is used instead of isolated line features, and these have a constant spatial frequency that is in between the spatial frequencies of both of the interferometer combs, which overlap it. Under the science Doppler signal, both moiré patterns would shift vertically in the same direction. This is good since their signals will add and become stronger. The wind cartoon on the right symbolizes environmental insults that shift both moiré patterns horizontally by $\Delta x$. In this case, both the starlight and comb move horizontally. As a result, there is no relative change, and the moiré would not move vertically. Because the two delays have slightly different periodicities, the slopes of the two moiré patterns are opposite. Thus, a sideways detector shifting insult, $\Delta x$, would produce opposite phase error contributions, which cancel. Hence, we can measure the science signal by a vertical shift of moiré, yet be immune to insults that shift the moiré horizontally. When using a single-delay configuration, a similar cancellation can occur between the fringing and native spectrograph signals analogous to the two-delay system.

Figure 6:
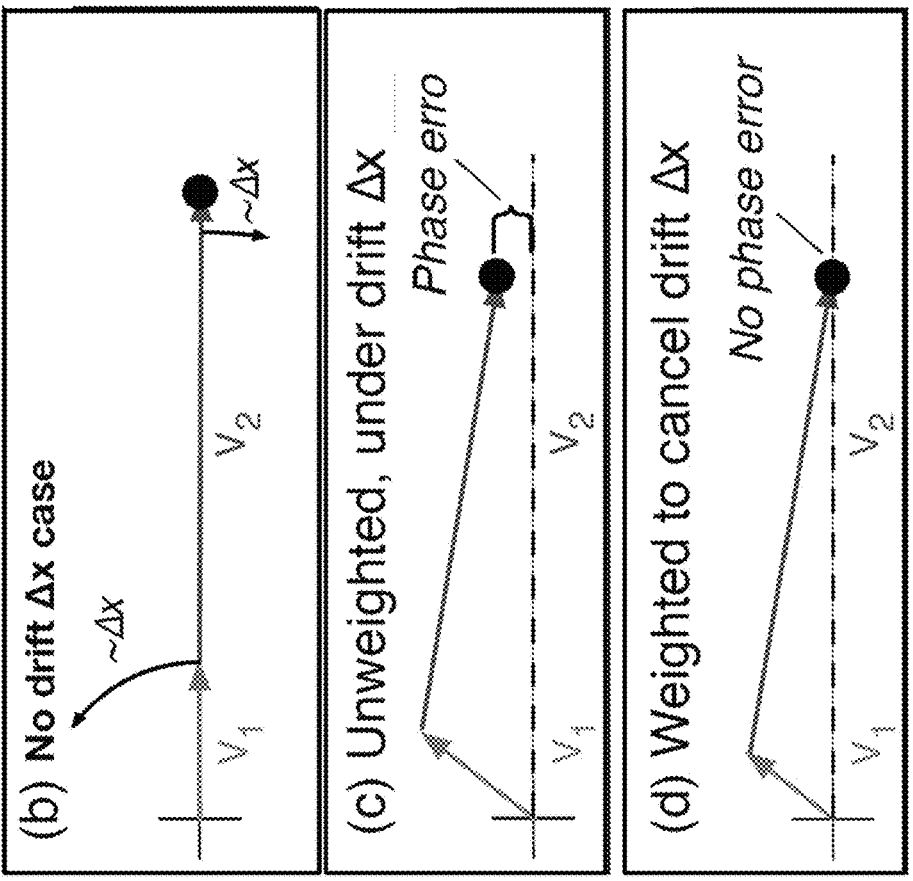
FIG. 6 illustrates modulation transfer functions associated with an EDI system with two delays and the effects of crossfading operations to an insult.
Figure 6:
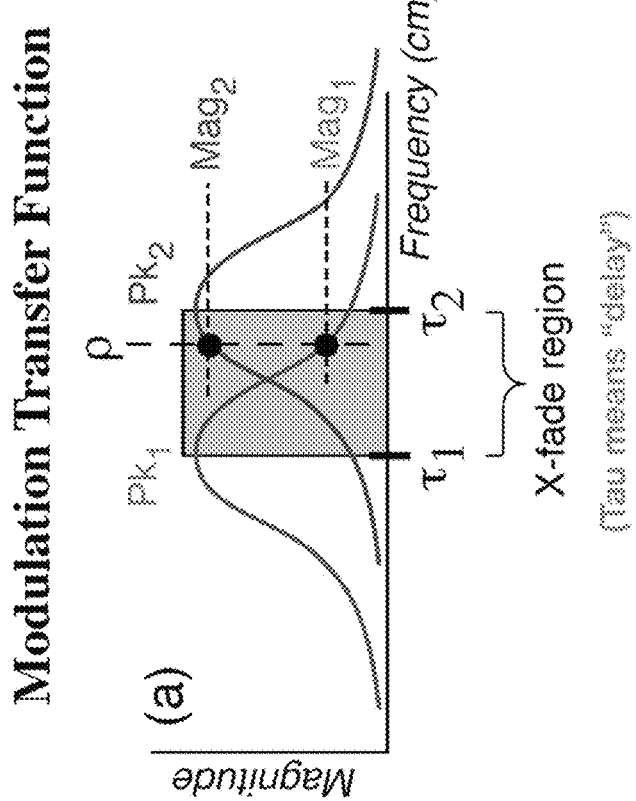

FIG. 6 illustrates modulation transfer functions (MTFs) for a crossfading pair of sensitivity peaks ($pk_1$, $pk_2$), at a specific frequency, $\rho$. While panel (a) of this figure illustrates two delays being crossfaded, when the first curve, $pk_1$, is shifted to the origin (i.e., $\tau_1=0$), it corresponds to the native nonfringing component, whereas the curve represented by $pk_2$ (when shifted by the same amount as the first curve to the left) represents the fringing component in a single delay EDI system. Horizontal axis is Fourier space frequency in units of features per $cm^{-1}$, or cm. That is, the delay and frequency have the same units and are proportional to each other, so we use the terms interchangeably. Panel (b) shows the sum of the two vectors ($V_1$ and $V_2$) contributed by the two peaks, $pk_1$ and $pk_2$, respectively, when there is no drift $\Delta x$. The angle established by this sum defines zero angle, and for convenience we orient this to the 9 o'clock position. In panel (c), the vector sum (labeled as "Phase error") is illustrated with no special weighting, likely due to incomplete phase cancellation; the phase error is small but nonzero. While, by luck, the lengths of the two vectors may happen to be such that the sum does not deviate in angle too much from zero, our goal is to carefully adjust the lineshapes (heights of the black dots) through crossfading weightings to improve the cancelation of phase error, to make it perfectly zero. In panel (d), the improved results with strategically chosen weighting are shown, creating nearly perfect cancellation, which can reduce the residual phase error dramatically. When this is done for every Fourier frequency, $\rho$, in the overlapped region between the two sensitivity peaks, maximal stability against unknown or unwanted offset insult $\Delta x$ is produced.

Figure 7:
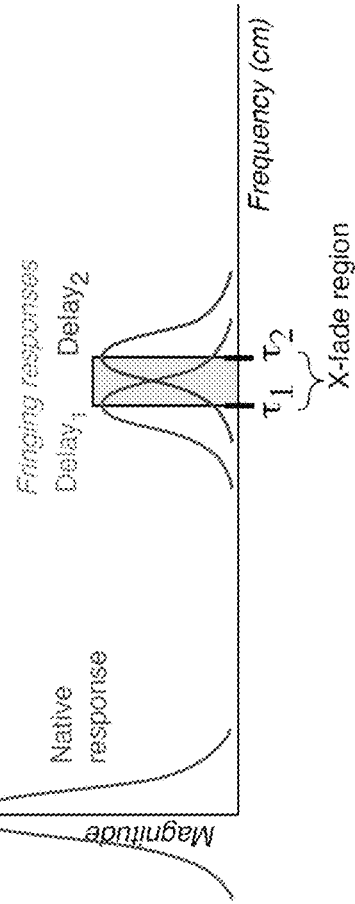
FIG. 7 is an illustration comparing some of crossfading characteristics of a two-delay system and a single-delay system.
Figure 7:
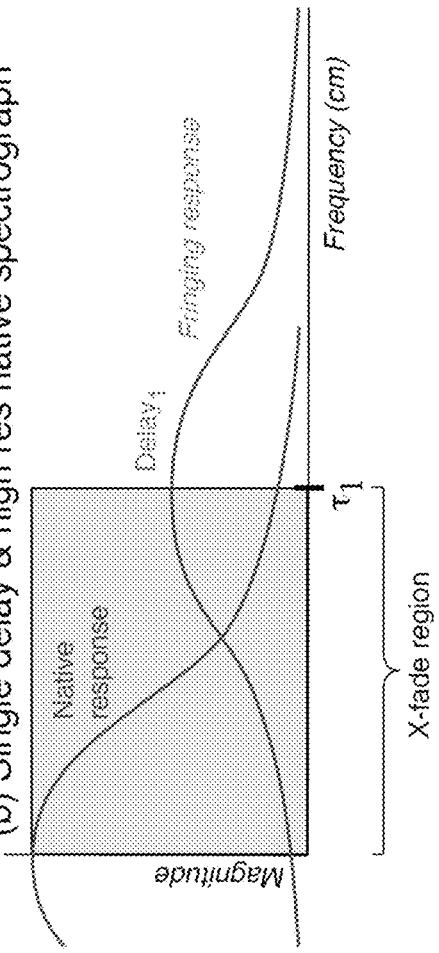

FIG. 7 compares, in frequency space, some of the crossfading characteristics of a two-delay system and a single-delay system. The behaviors of the two types of crossfading are illustrated in MTF or frequency space, where panel (a) represents a paired-delay system, and panel (b) represents a single-delay system. The MTF is the Fourier transform of the instrument's response in wavenumber space (see FIG. 8). As noted earlier, in these figures, frequency has the same units as the delay, which is features per $cm^{-1}$, or cm. More specifically, panel (a) in FIG. 7 illustrates the crossfade between two delays overlapped in frequency with each other (grayed regions labeled "X-fade"). These could be far from the response of the native spectrograph (centered at the origin). In contrast, panel (b) illustrates using a single delay instead of multiple delays, where the delay is low enough (or the native spectrograph resolution high enough) that the frequency response of the native and single delay overlap. The typical application for case (b) is general purpose spectroscopy to map the spectrum, or Doppler velocimetry. For example, the spectrograph resolution is already high enough to measure Doppler velocity but one wants to improve its stability against insults.

Figure 8:
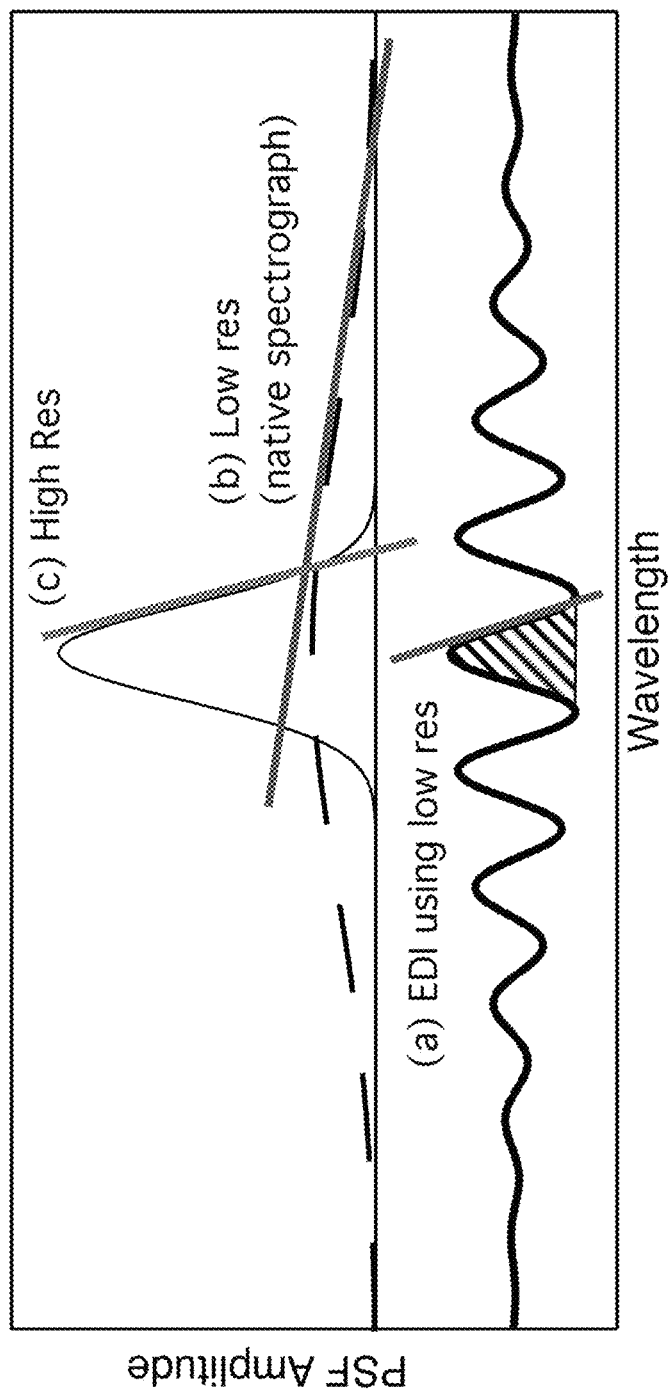
FIG. 8 illustrates an EDI instrument's response as a function of wavelength.

FIG. 8 illustrates the EDI instrument response (point spread function (PSF) amplitude) as a function of wavelength. As illustrated in FIG. 8, the response in output dispersion space (wavenumber or wavelength) is in the shape of a wavelet. This is what is created when we take the moiré recorded on the detector and numerically shift its frequencies back up to their original values (a process called heterodyning reversal). The wavelet envelope is the same as the PSF (long dashed curve) of the conventional spectrograph used in series with it. The interior shape is a sinusoid whose frequency is set by the interferometer delay, and whose phase carries location information of the spectral feature being measured. This sinusoid is very stable, which making it ideally suited to making precision wavelength measurements, and the corrugations have a high slope similar to higher resolution spectrographs. In contrast, a conventional spectrograph instrument response is more unstable.

Figure 9:
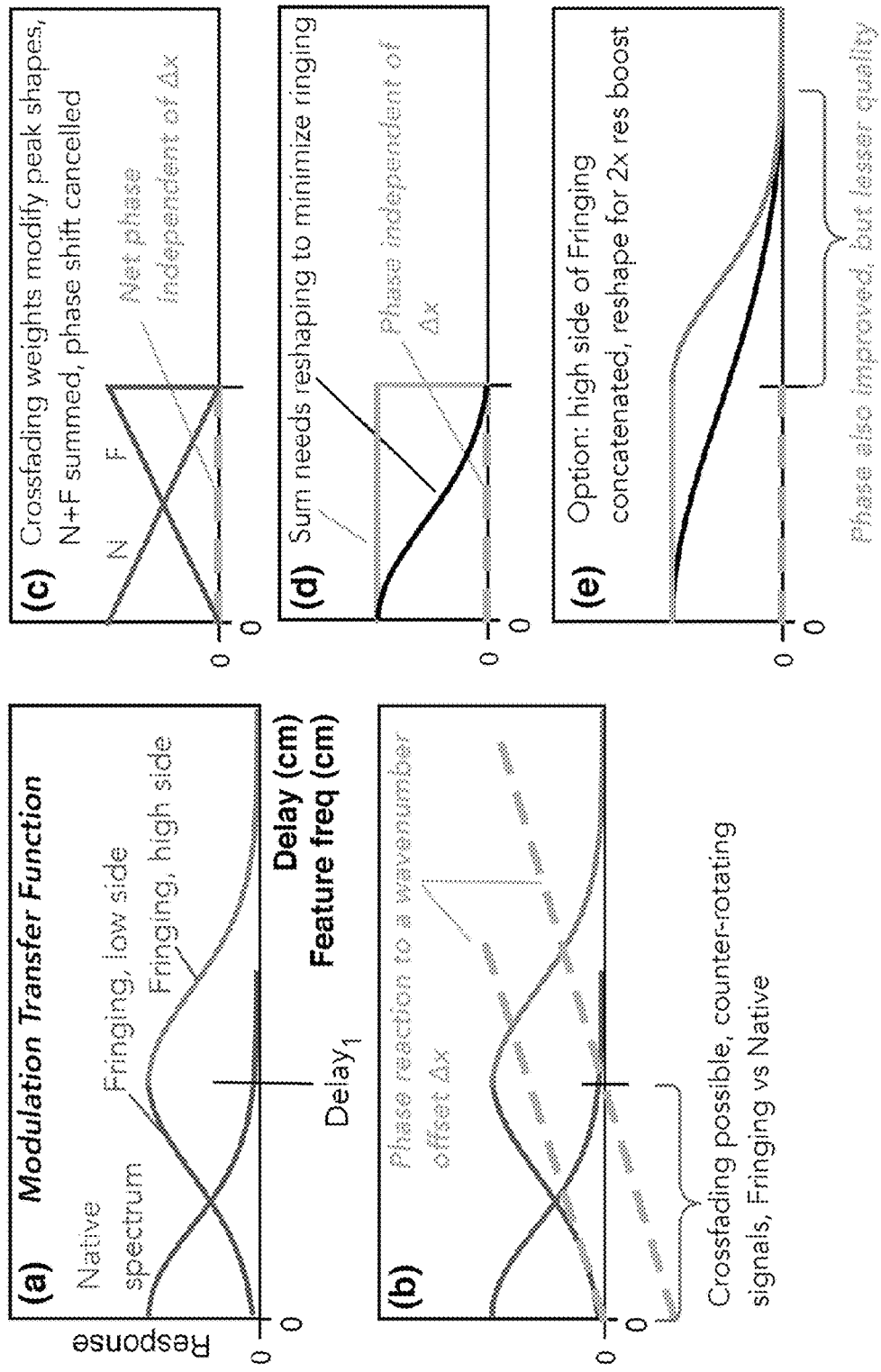
FIG. 9 illustrates frequency domain representations of various steps in a crossfading process between a single delay and the native spectrograph modulation transfer functions.

FIG. 9 shows the notional steps through the crossfading process between a single delay and the native spectrograph, displayed in Fourier space (also called a Modulation Transfer Function, MTF). Horizontal axis for all panels is frequency, v, of spectral features in the input spectrum, features per wavenumber, and have units of $1/\text{cm}^{-1}$, and hence cm. In panels (a) and (b), the interferometer path length difference between arms of $\text{Delay}_1$ has a sensitivity peak, labeled "Fringing." The lower and higher frequency halves of the fringing peak are annotated separately. The fringing component is identical in shape to the native spectrum sensitivity peak but shifted up in frequency by amount of $\text{Delay}_1$, due to a heterodyning effect. Hence the interferometer can better detect narrow (high frequency) features than the native spectrograph used alone. An ideal choice of $\text{Delay}_1$ for crossfading is on the wing of the native sensitivity curve as shown, so that the fringing curve approximately crosses the native curve about half-way between 0 and $\text{Delay}_1$.

Panel (b) indicates, with dashed lines, the linear reaction of the phase of the MTF (which is a complex quantity) to a small wavenumber offset $\Delta x$, which is equivalent to multiplying by a phasor $e^{j2\pi(v-\tau)\Delta x}$, where $\tau = \text{Delay}_1$ for the fringing peak, and $\tau = 0$ for the native peak. As will be described in further details below, for frequencies between 0 and $\text{Delay}_1$, the native and fringing phase reactions are counter-rotating, which can provide a "restoring force" that can cancel the net reaction to an insult $\Delta x$. This is where crossfading is possible.

Panel (c) of FIG. 9 illustrates plots after applying frequency dependent crossfading weightings to the data to cancel the phase of the combined complex signal. Importantly, the contribution of the native component must go to zero at frequency $\text{Delay}_1$. The panel shows a linear or triangular shape to the peak shapes after weighting, but other shapes are possible. The triangular shape is the easiest to visualize since its sum has constant amplitude, as seen in the rectangular feature of panel (d).

Panel (d) illustrates a subsequent step (equalization), which applies weights to the sum (rectangle) of fringing and native so that it has a Gaussian-like shape that minimizes ringing in wavenumber space. Panel (e) illustrates an optional 2× resolution boosting in which the high frequency side of the fringing peak is concatenated to the edge of the square box. This is done after first using the new knowledge of $\Delta x$ obtained from panel (c) to shift the raw data, so that the high frequencies (all frequencies actually) are improved in accuracy. As a result, concatenating them to the lower frequencies does not seriously worsen the net wavelength shift error. However, since this high frequency signal component is not opposed by any other signal component (like in the overlap region between fringing and native components in panel (b)), there can be a minor increase in residual phase error, which in many applications is a small penalty worth the reward of higher spectral resolution.

Notably, the disclosed single delay crossfading techniques, in their basic form, use just the lower frequency half of the fringing component. This is because the lower frequency half of the fringing peak frequencies move in phase in opposition to the phase of the native spectrum reacting to insult $\Delta x$. By strategically combining amounts of this opposition signal with the native signal, we can cancel or nearly cancel the net effect of the drift. This opposition is illustrated in dispersion space (that is by wavelets) in the lower panel in FIG. 10, which shows wavelets that are created from just the lower half of frequencies, and just the higher half of a fringing peak (see lower panel). Significantly, the lower frequency wavelet moves oppositely to the native spectrum which is reacting to the applied insult offset (see large arrows pointing in opposite directions).

Figure 10:
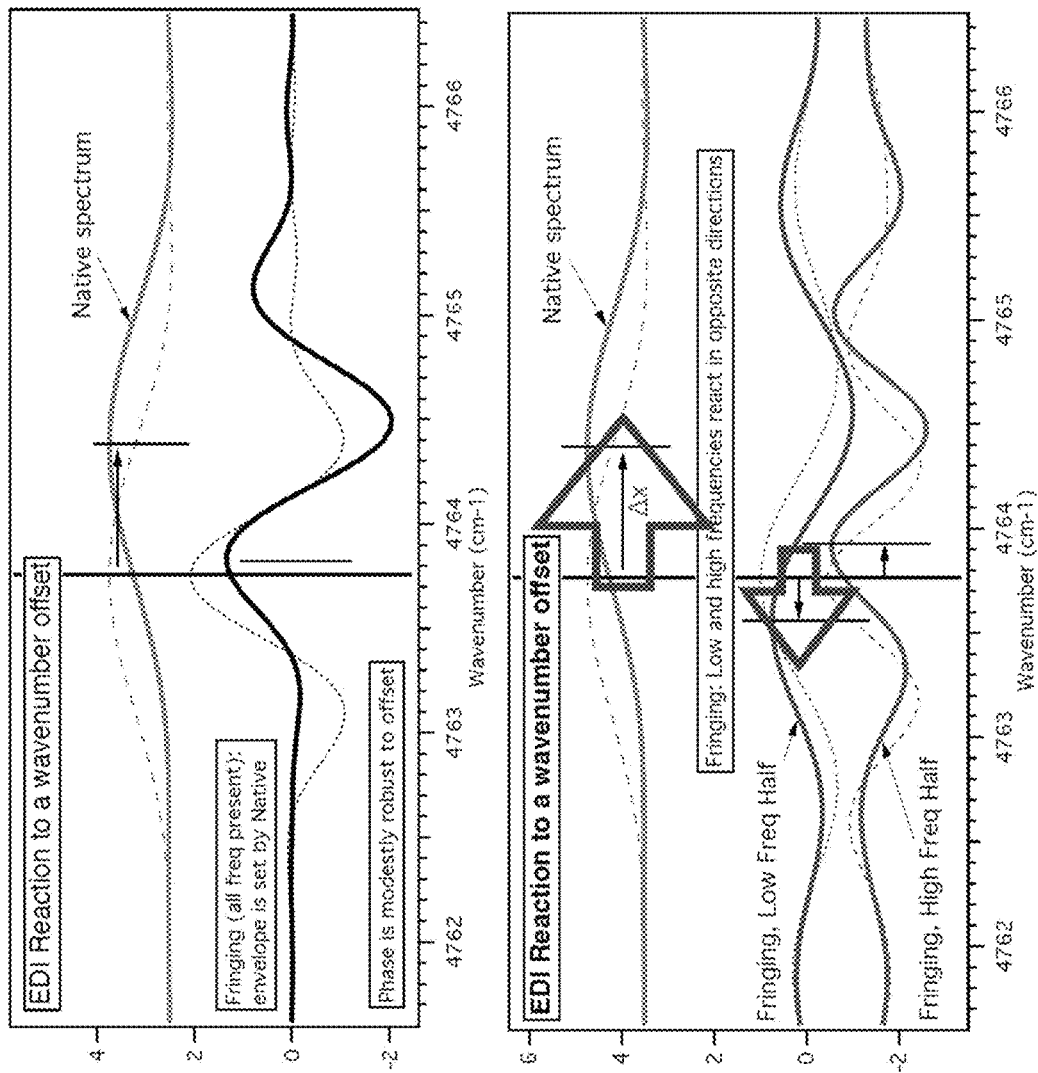
FIG. 10 illustrates the reactions of the fringing component of the EDI signal compared to the native component of the EDI based on the disclosed technology.

More specifically, FIG. 10 illustrates the reaction in wavenumber space to the fringing component of the EDI signal compared to the native component of EDI. In the upper panel, the EDI fringing component (lower curve) and native spectrum (upper curve) are plotted in dispersion space, illustrating the reaction to an applied wavenumber offset $\Delta x$, when all frequencies of the fringing signal are used. Dashed and bold curves indicate original and shifted versions. In particular, the fringing component is a wavelet whose envelope is the same as native spectrum PSF peak (upper curve). When it is translated by $\Delta x$ of ~0.6 $\text{cm}^{-1}$, the fringing wavelet shifts to the right (dotted to bold) by only a small amount ~10% of $\Delta x$ (while the phase of the underlying wavelet is relatively unchanged). That is, even a basic un-crossfaded EDI provides an order magnitude of stabilization. However, with crossfading we can attain much more stabilization.

Lower panel of FIG. 10 displays the native spectrum (top curve), and the fringing peak's wavelets for high (lower curve) and low (middle curve) frequency halves in wavenumber space. The lower panel illustrates the reaction when half the frequencies of the fringing signal are used. Significantly, the low frequency wavelet shifts in the opposite direction as the native spectrum. This provides the means for cancelling out the net reaction to an insult $\Delta x$, if the native and low frequencies are combined with strategically chosen weights. This also suggests that including high frequencies (higher than the delay 0.66 cm in this example) can be undesired since it shifts in the same direction as the insult.

Figure 11:
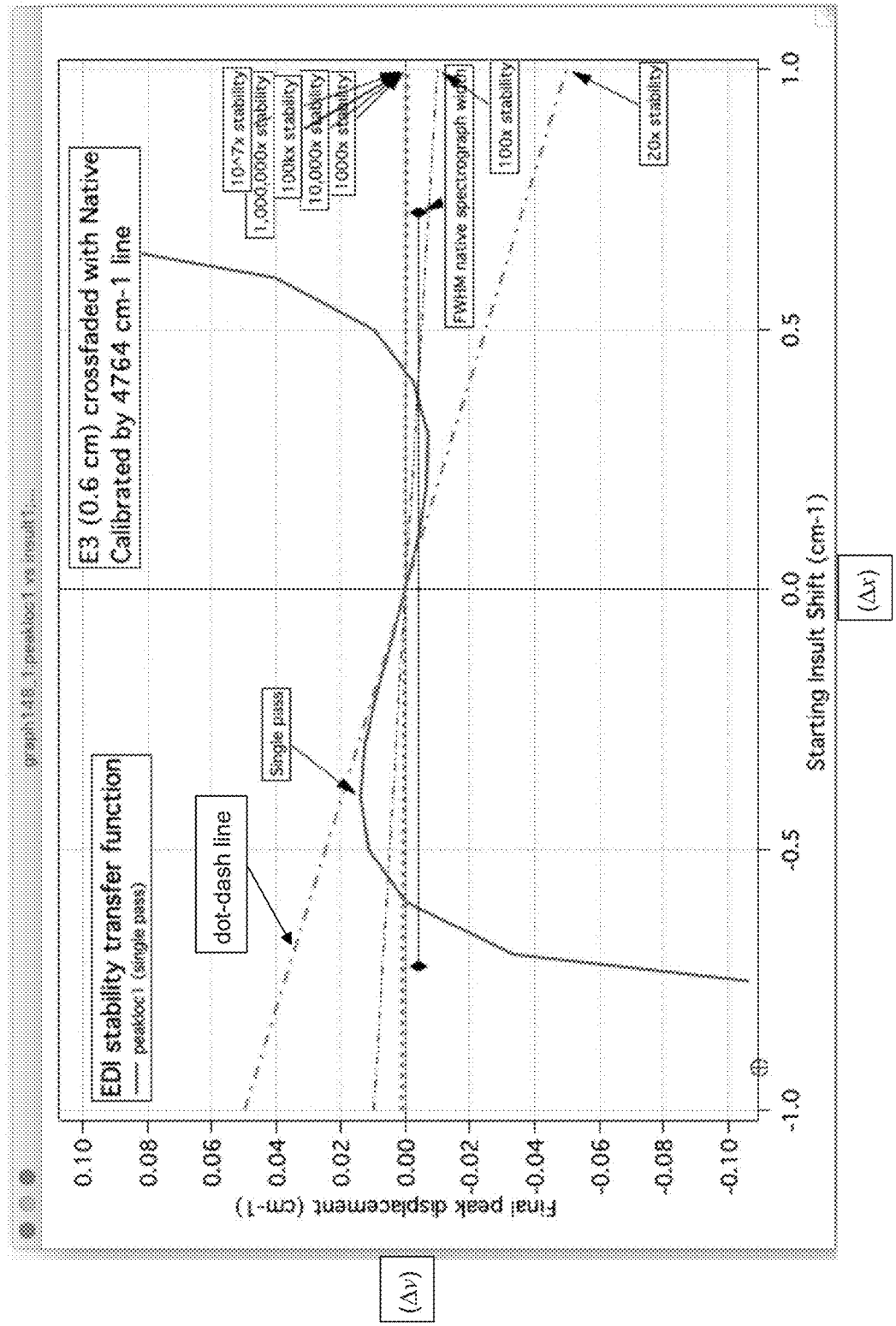
FIG. 11 illustrates the EDI stability transfer function for a single pass of the single-delay crossfading process in accordance with an example embodiment.

FIG. 11 illustrates the EDI stability transfer function using an example plot of peak displacement ($\Delta v$) versus input shift ($\Delta x$) for a single pass of the single-delay crossfading process. These results were obtained by processing real measured data but with artificial displacements $\Delta x$. In the inner region (small Δx), the slope is the Translational Reaction Coefficient (TRC), and its reciprocal is the stabilization gain. We define TRC to be the dimensionless slope of output spectrum shift, Δv, over insult shift, Δx, with the numerator and denominator shifts being in the same units, whether it be pixels, wavelength or wavenumbers. When in wavenumbers (v), TRC=(Δv/Δr), and the stability gain would be (Δx/Δv). We tested at the 4849 cm$^{-1}$ ThAr line (our "science" line), where weighting coefficients were chosen from observed reactions at the 4764 cm$^{-1}$ line (our "calibration" line). The results show the crossfading works for an insult Δx that is within ~±0.75 cm$^{-1}$ of its true location (about one FWHM of native spectrograph, black diamonds). For small Δx, the output shift, Δv, is approximately linear with a slope TRC of ~0.05 (dot-dash line), hence we say the (reciprocal) stability gain is ~20×. This means for a single application of crossfading between a delay E3 (0.6 cm) and the native spectrograph the wavenumber offset is reduced 20×. Repeated iterative application of crossfading can improve the net stability by several orders of magnitude (e.g., three iterations can produce as much as 20*20*20=8000 times stability).

For a conventional dispersive spectrograph, TRC=1, by definition, since there is 1:1 correspondence between a position on the detector with the output spectrum. We desire TRC to be zero or as small as possible, so that under a given environmental insult, Δx, the reaction shift, Δv, in the output spectrum is as small as possible. The crossfading EDI can be used together with conventional mitigations, which reduce Δx, so that the net stability gain is a product of the two individual stability gains. This is because the conventional stability reduces Δx, while the EDI reduces TRC. Since the net shift is a product TRC*Δx, this is reduced by both conventional and crossfading EDI methods, which are independent of each other.

For the single-delay EDI, we are seeing TRC in the range 0.05 to 0.02, for stabilization gains of 20× to 50×, roughly. This may be less impressive than the TRC we observed with multiple delay crossfading EDI where we saw TRC in range of 0.001 and gain of 1000×. This is due to the smaller delay value of the single delay, which is the "lever arm" in the math—multiple delay EDI can have larger delays since they do not need to overlap with the native response which is near the origin. However, the single-delay TRC is still small enough to be quite useful and include features and benefits disclosed herein.

Iterative Application of Crossfading: In some embodiments, we can apply the crossfading process iteratively, by taking the result of the initial crossfading to inform us what the insult Δx was (which was initially unknown), then shifting the raw data by that −Δx to correct for it, then applying the crossfading again for an improved result. Iterating (discussed with further details below) can result in a final effective TRC in the order of 0.001 and stability gain in the order of 1000×.

Example Demonstrations of Single-Delay Crossfading:

Irregular Bipolar Drift Corrected: As mentioned earlier, the disclosed single-delay crossfaded EDI can indeed stabilize an irregular bipolar drift. One example of the correction results was discussed previously in connection with FIG. 3: synthetic data (upper) was designed to simulate irregular bipolar drift, which were corrected (bottom) using the disclosed single-delay crossfading techniques. Since an irregular and bipolar drift is the most difficult kind to correct and cannot be compensated by a simple mathematical translation of the spectrum, this is a quite remarkable demonstration of a crossfading EDI's abilities.

Figure 12:
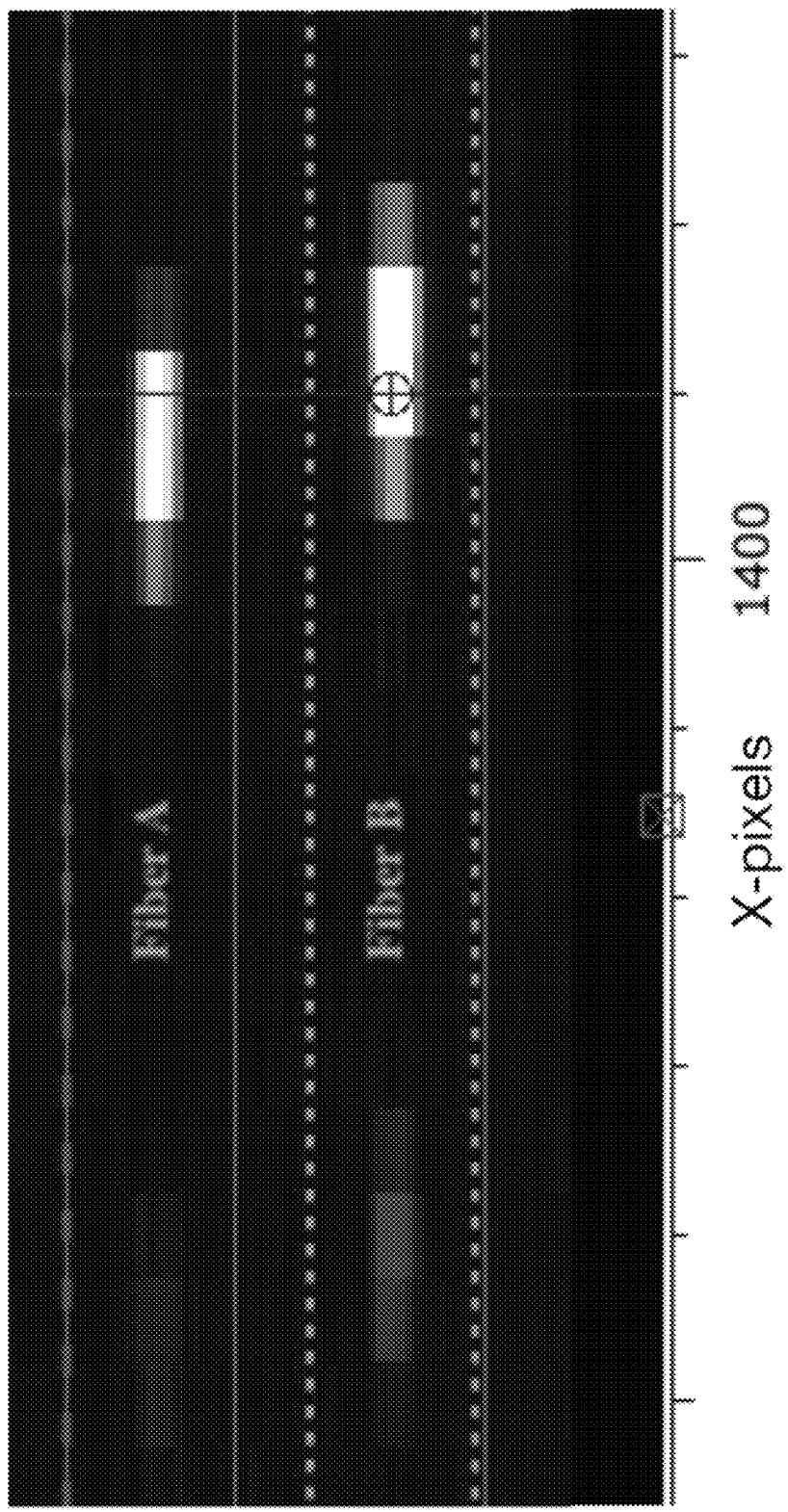
FIG. 12 illustrates a small section of an echelle spectrograph based on raw data measured in an experiment.

Drift on Mt. Palomar Spectrograph: FIG. 12 shows a small section of the echelle spectrograph raw data we measured at Mt. Palomar Observatory experiments. Counts summed along each column form the spectrum (wavenumber varies horizontally). The figure illustrates, dispersed on the detector, the relative positions of the same ThAr lamp light from two fibers A and B. Due to the geometry of the echelle optics, the horizontal positions for the same wavenumber are slightly displaced by about 1 pixel, creating a wavenumber offset of ~0.6 cm$^{-1}$ between fibers A and B. This creates a wavenumber offset between signals comparing fiber A and B. We use this (natural Δx) to test our ability to correct an offset using our crossfading technique, as explained in connection with FIG. 13 below.

Figure 13:
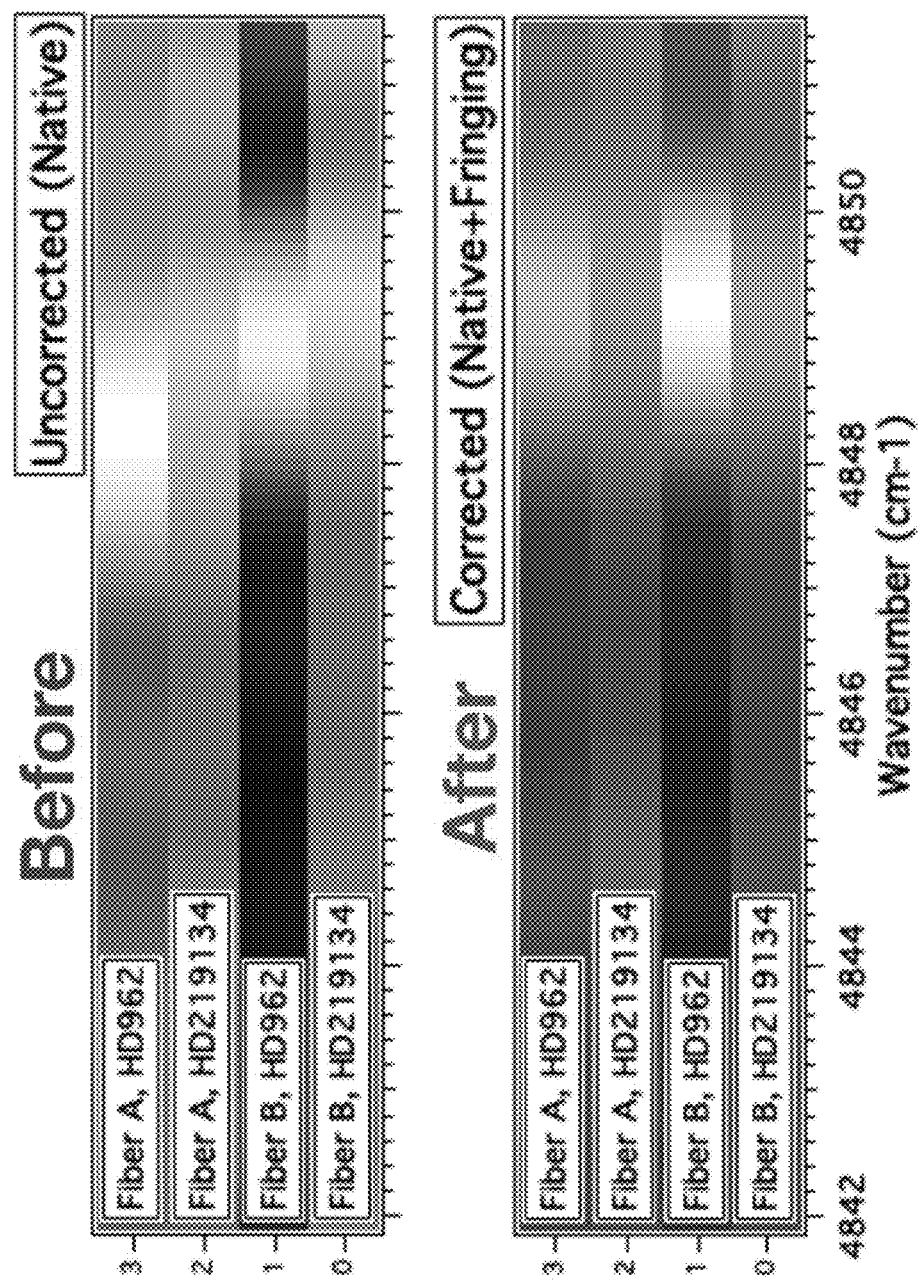
FIG. 13 illustrates the results of crossfading performed on the experimental data collected in accordance with FIG. 12.

FIG. 13 demonstrates the results of crossfading performed on stellar data in four cases based on: fibers A and B, and stars HD219134 and HD962, observed on the same night but an hour apart. As noted in connection with FIG. 12, spectrograph optics create a wavelength offset between A/B source fibers. An additional offset for different stars is due to drift over time (1 hour), due to perhaps gravimetric or thermo-mechanical in origin. This creates slightly different net offset values in the four rows: Δx=0, −0.3, −0.6, and −0.9 cm$^{-1}$ (upper panel). The bottom panel in FIG. 13 illustrates the results after the crossfading process is applied, and the net offset is removed. A 4764 cm$^{-1}$ ThAr line (off graph) provides absolute reference for the interferometer phase. The parallelism of the features in the lower panel indicates success of the crossfading to stabilize.

Examples of Calculating Crossfading Weights: In order to choose the weights to force cancellation, we need to mathematically probe how sensitive they are to Δx. This process is illustrated with the help of FIG. 14 which illustrates the computed reaction of the calibration ThAr peak at 4764 cm$^{-1}$ to a test value of Δx. This can be done by using our data processing software looking at the ThAr data and displacing it by small amounts and measuring the reaction. Upper plot shows results for all example delays E1 through E6 of the instrument used (E7, E8 are off the graph to the right and the native peak is labeled E0). The delays can be found by fitting known ThAr features across a wide bandwidth. In this example, the delays E1-E8 have values of 0.083, 0.339, 0.66255105, 0.961, 1.27, 1.75, 2.92, 4.63 cm, which also control where the S-shape crosses zero. The lower plot shows only the two example delays that we used for single delay crossfading: the native reaction (E0), and the E3 etalon.

Note that S-like shape and that the negative portion of the E3 curve approximately matches in position the positive portion of the native curve, for frequencies between 0 and about 0.7 cm. From this, we know for this single-delay demonstration to limit it to frequencies below 0.7 cm. Hence the table in the lower part of FIG. 15 only has nonzero values from rows 0 to 6 (at 0.1 cm per row). We chose E3 over E2 because it is better positioned relative to the hump shape of E0 to provide better cancellation.

Figure 15:
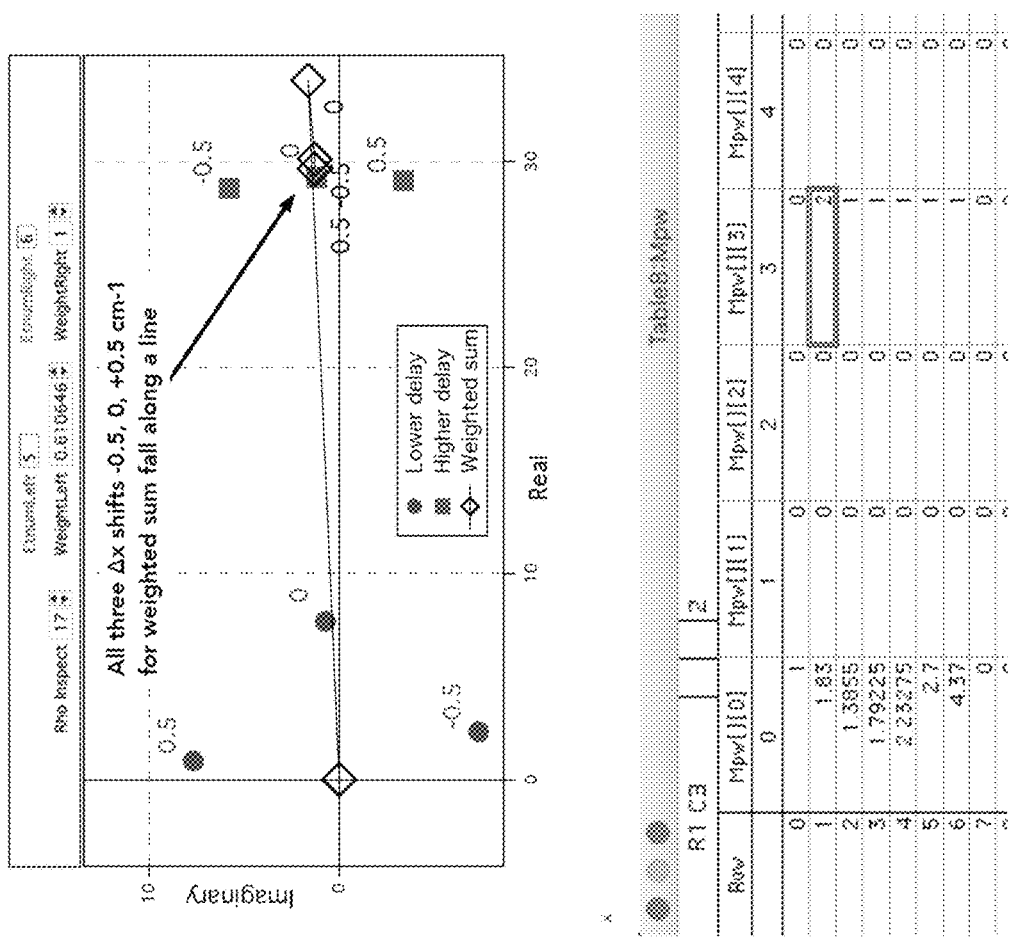
FIG. 15 illustrates a specific example of geometric construction and a table of results that were used in example crossfading computations.

FIG. 15 shows a specific example of geometric construction (upper) and a table of results (lower) that were used in the crossfading computations to choose the ratio of two weights "WeightLeft" and "WeightRight" for two sensitivity peaks (EtnumLeft=5) and (EtnumRight=6) at a Fourier frequency of 1.7 cm (Rho inspect=17). The graphic corresponds to a multiple delay crossfading but is used here to illustrate single delay crossfading, by substituting the native peak (E0) for the left peak (i.e., EtnumLeft=0), and substituting etalon E3 for the right peak (i.e., EtnumRight=3). This example geometric construction adds the two vectors (high delay vector endpoints shown as solid squares, and low delay vector endpoints shown as solid circles), which are the two complex values of the Fourier transform of how the calibration ThAr peak at 4764 cm$^{-1}$ reacts to an applied wavenumber offset Δx of either −0.5, 0 or +0.5 cm$^{-1}$. The sum vector (of the low and high delay vectors) is shown as the open diamonds, for the three test cases of Δx.

The goal is to adjust one or both of the values of WeightLeft and WeightRight so that the diamonds for −0.5 and +0.5 cm$^{-1}$ fall along the same black line (which is at a slight angle approximately zero at the 9 o'clock position). Here, for convenience, we keep WeightRight constant at 1 and only adjust WeightLeft. The lower part of FIG. 15 shows a table of results for single crossfading between the native sensitivity curve (E0, first column called Mpw[ ][0]) and the E3 delay (column called Mpw[ ][3]). The values of all the other etalons (the other columns 1, 2, 4 and greater) have been set to 0. The key idea is that when the weight ratio is chosen correctly, the phase (angle of the sum vector, open diamonds) does not change versus the insult. Note that the angle associated with the circle at 0.5 Δx value is counter-clockwise from the 0 position at near 9 o'clock, but the value corresponding to the 0.5 square is clockwise. This demonstrates that under an insult, the lower and higher sensitivity peaks rotate in phase in opposite directions, for this specific Fourier frequency. This opposition is necessary for the crossfading to work (by producing a cancelling effect). The sum of the vectors for 0.5 is the black diamond that falls along the same line (has same phase) and the 0 labeled black diamond. Hence, the phase angle of this Fourier component is independent of Δx. When the weights are chosen this way for all the relevant Fourier frequencies, the entire signal in wavenumber space is independent of position of Δx, which means it is perfectly stable.

Example equalization: referring back to FIG. 9, panel (d), equalization can be performed to produce a Gaussian-like shape. Equalization, which is applied after the crossfading weights are applied, corrects distortions that are imparted to the lineshape of the peak, and forces the net lineshape of the crossfaded peak to return to a Gaussian-like shape in frequency space, which minimizes ringing in wavenumber space. In the above example, the equalization values can be determined by examining the "calibration" line 4764 cm$^{-1}$ and taking the ratio between the Fourier transforms of the ideal Gaussian shape that is desired (which we are allowed to set with a custom FWHM), divided by the Fourier transform of the actual lineshape (point spread function, PSF) of the line. For the crossfading processing, we chose a FWHM that is the same as the native spectrograph, hence we call this 1× resolution boosting. (However, we also demonstrate an optional last step in the process (after iterating) where we include high frequency fringing information and, for that option, we choose a FWHM that is half as wide, and call that 2× resolution boosting, as illustrated in FIG. 9, panel (e)).

Because of the equalization step, the absolute magnitude of the two weightings we choose for each Fourier frequency is not of concern (the absolute magnitudes will be repaired during this equalization step), and we only need to be focus on their ratio.

Figure 16:
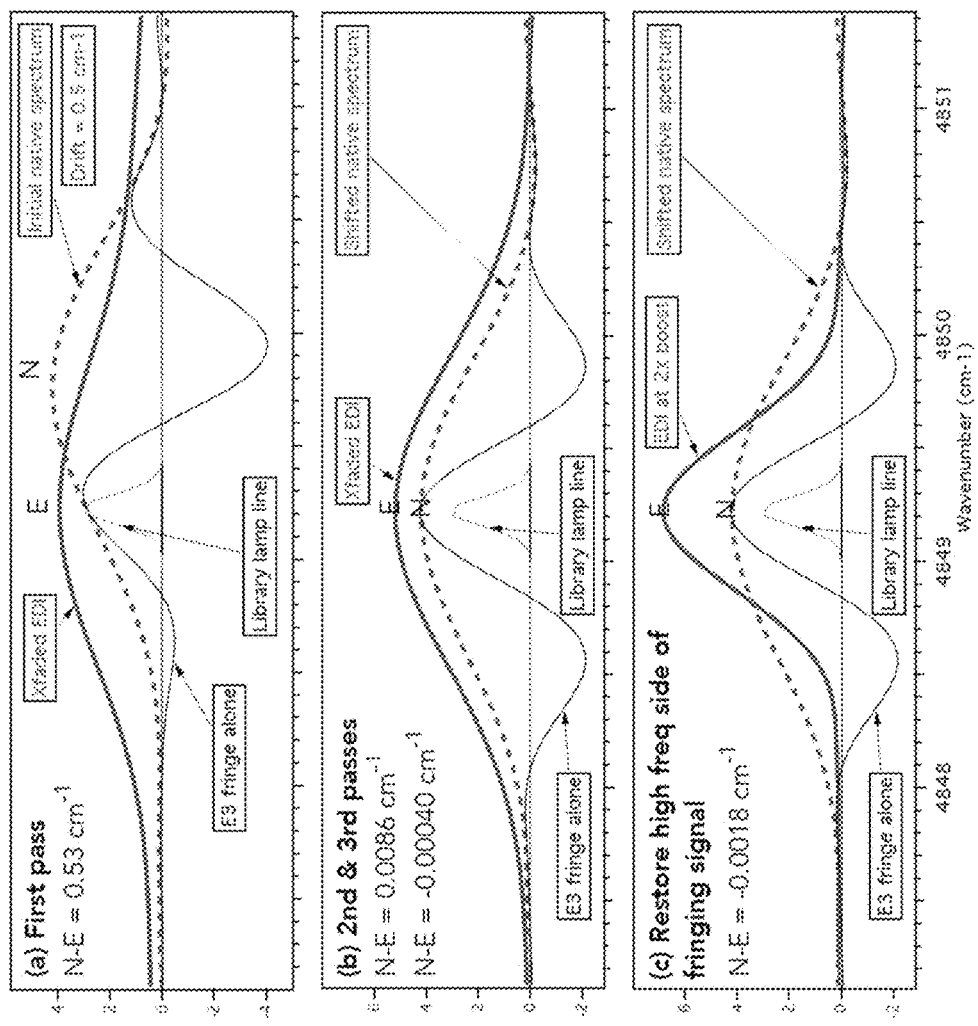
FIG. 16 illustrates an iterative application of crossfading in accordance with an example embodiment.

More on Iterative Application of Crossfading: FIG. 16 illustrates an example iterative application of crossfading, on the 4849 cm$^{-1}$ ThAr lamp line which acts as the "science" line. The interferometer phase was calibrated at the 4764 cm$^{-1}$ line. The library ThAr spectrum, although shown for comparison, was not otherwise used for this calculation. Panel (a) illustrates the first pass, showing the native spectrum peak (dashed line labeled as N) at ~0.5 cm$^{-1}$ to the right. The peak of the E3 etalon fringe suggests the true location, but it is distorted by the bad envelope of the native peak. The crossfaded EDI result (solid line labeled as E) is a better estimate. The distance (N-E) is 0.53 cm$^{-1}$. Hence for the next iteration (panel (b)), we translate the raw data by 0.53 cm$^{-1}$, apply crossfading, and so on. Distance (N-E) reduces to 0.0086, −4×10$^{-4}$, 2×10$^{-5}$, −1.4×10$^{-6}$, −2.6×10$^{-7}$ and 4×10$^{-7}$ cm$^{-1}$ in 6 iterations, respectively.

Panel (c) illustrates the application of an optional 2× resolution boost. After many iterations the raw data is close to its true location. Hence, we can add the high frequency side of the fringing peak that was ignored during crossfading, and re-do the equalization to boost the resolution to twice its original value (depending on size of delay relative to native peak width). In the example illustrated in panel (c), the (N-E) value increased mildly to −0.0018 cm$^{-1}$, which is still 300 times better than the original 0.536 offset, but not as good as the 4×10−7 cm$^{-1}$ of the 1× resolution boost case of panel (b).

By iterating we can achieve a final stability gain much larger than in a single pass (such as characterized in FIG. 11). For example, even though the single pass gain stability may be only 20× to 60×, after several iterations we can achieve stability in the ~1000× range.

It is evident based on the above examples, that the disclosed embodiments, among other features and benefits, describe generation of a signal component in the EDI fringing data that moves in opposition to the insult offset Δx, the latter which can be of unknown value and polarity. Combinations of this opposition signal component with the native spectrum improve the accuracy of the location and shape of the combined spectrum, compared to the native spectrum alone. This opposition signal is generated by emphasizing the lower frequencies of the fringing response compared to the higher frequencies.

The fringing response is generally a peak centered at a value set by the delay value of the interferometer, having a shape similar to the native response, but a height which is different. The disclosed embodiments can be implemented to select a frequency dependent weight which multiplies the strength of the fringing response relative to the native response. The optimal weight is one that minimizes the change in phase of the net combined signal of fringing plus native signals, for that frequency. In other words, on a frequency-by-frequency basis we can choose the relative weight of the fringing to native signal to make a combination signal that is maximally stable to, or independent of, a range of changes in Δx that could be present. For example, if the fringing signal for a given frequency reacts in phase to Δx half as much as the native signal, and reacts in the opposite direction, then the optimal weight for the fringing is twice the weight given to the native, so that after weighting the two reacting signals are equal and opposite, and so that the net fringing plus native combination has zero net phase reaction to a Δx.

As a further elaboration, the native spectrum used alone is inaccurate because of the unknown wavenumber offset Δx; the fringing signal alone is also inaccurate because of an unknown amount of distortion imposed by the envelope of the wavelet, which is set by the native spectrum. However, the crossfaded combination of native and fringing signal can be more accurate than either component used alone. Accordingly, the combination signal is used as a better estimate of the true position and shape of the spectrum. By comparing the location of the crossfaded result with the native result, one can compute an estimate of Δx, which may have initially been unknown in polarity and size. This completes an iteration in the effort to find a more accurate version of the spectrum's wavenumber position and shape. This process of iterating to a more and more accurate estimate of the true position of the spectrum is also called convergence, if the iterated result becomes closer and closer to the true answer.

Then for the next iteration, the original data of the spectrum, native and fringing, are shifted in wavenumber to better improve the final position and shape of the spectrum, using that last new estimate for $\Delta x$. This shift can be locally (over small amount of wavenumber distance) represented as a mathematical translation of the original data along the dispersion axis in a direction that usually is opposite to $\Delta x$, so that it counteracts its ill effects on the spectrum. Its value can be a smaller or larger than $\Delta x$. If smaller, it means that more iterations will likely be needed to eventually shift the original data to the most accurate position. If larger, there is a danger that the iteration will blow up or not converge, meaning the accuracy of the iterated result may get worse and worse with the number of iterations instead of better and better. Experimentation with the character of the data at hand will reveal a good size of the amount of correction to apply at each iteration to insure eventual convergence in a reasonable number of iterations.

In some embodiments, the high frequencies (the half of frequencies of both native and fringing that are higher than the delay) can be used, after correcting the insult in the original data by translating it by an amount opposite to $\Delta x$. This occurs after one or more applications of crossfading to determine the true value (or reasonably good estimate) of $\Delta x$. Then as a subsequent step of equalization, the overall frequency response can be made to have Gaussian-like shape, to minimize ringing in the instrument response in dispersion space.

Using the single-delay crossfading techniques disclosed herein, the requirement that the insult $\Delta x$ be the same for the two delays is automatically satisfied since the two signal components (native and fringing) come from the same set of data (and are just processed differently). This means that insults of a wider range of time scales can be stabilized. It also means that every EDI (which are born having a single delay) can be used without having the onerous requirements to have simultaneous multiple delays, or to change delays in a rapid sequence in a smaller time scale than time dependence of insult. Also, since every EDI was born a single-delay EDI, it may be possible to retroactively apply crossfading techniques to many cases of older EDI data that was taken long before crossfading was developed.

In some examples disclosed herein, the crossfading weights are calculated from studying the reaction of a relatively small bandwidth (in wavenumber space) surrounding an isolated ThAr peak, being 200 points times 0.05 $cm^{-1}$ per point for a bandwidth of 10 $cm^{-1}$. This small size is desirable to minimize the number of discrete weights that need to be chosen. However, once we have chosen them, in some embodiments, we find that it is practical to interpolate the weight versus frequency (cm) curve to finer Fourier values, and process wider bandwidth data, much wider than the original 10 $cm^{-1}$. The process is to Fourier transform the region of spectrum of interest, multiply it by the interpolated weights vs. frequency (cm) curve, then inverse Fourier transform it back to wavenumber space. For example, the reaction curve of FIG. 14 and table of weights at bottom of FIG. 15 are spaced every 0.1 cm (because that is the spacing that comes from Fourier transforming a wave of bandwidth 10 $cm^{-1}$). But we applied these weights to much wider bandwidth data of FIGS. 3 and 13 that have widths of 240 $cm^{-1}$ (only a subset of the bandwidth is shown in those graphs). Additional details and analysis are provided in Appendix A.

Figure 17:
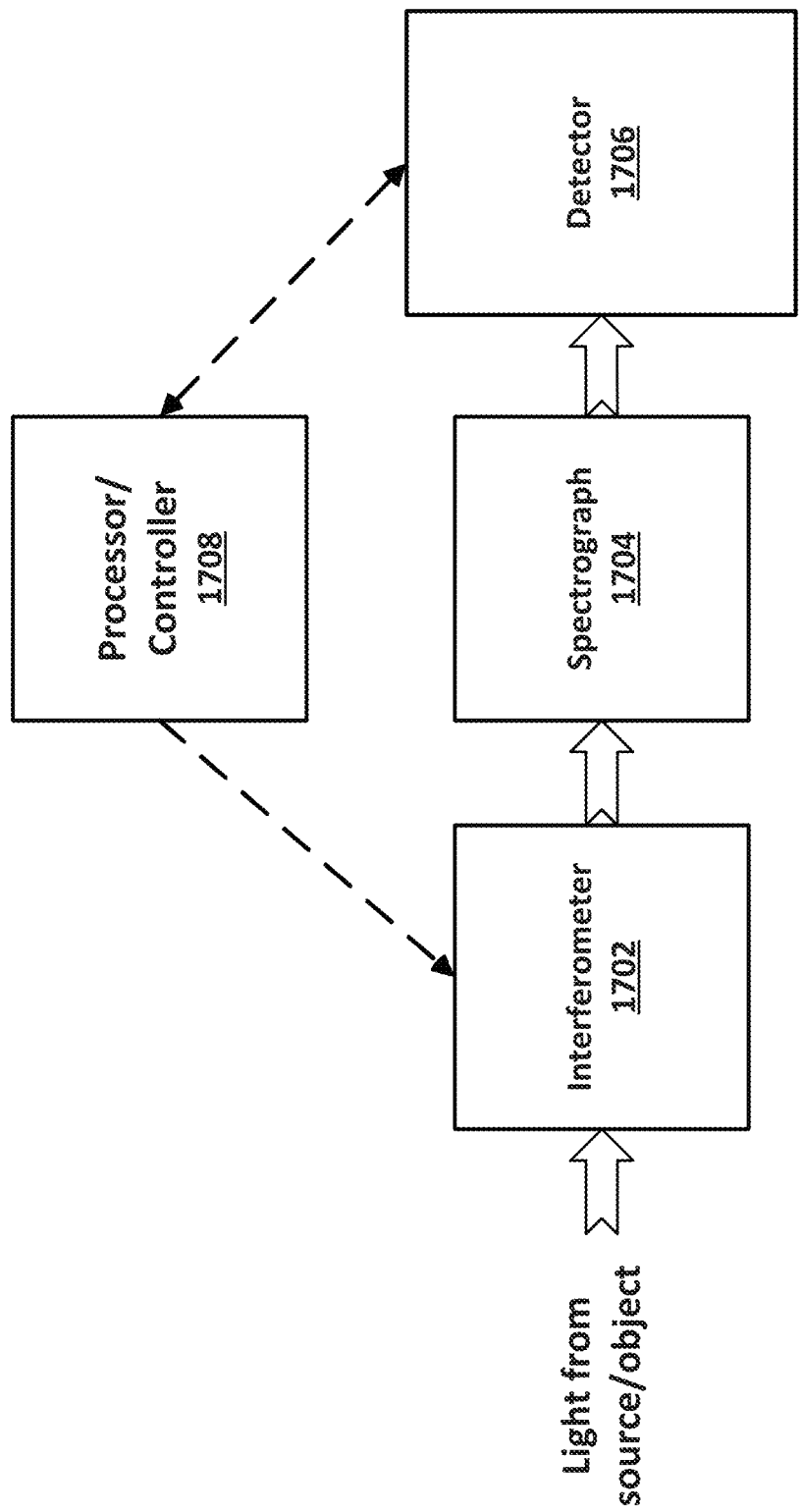
FIG. 17 is a block diagram of various components of a crossfading EDI system in accordance with an example embodiment.

FIG. 17 illustrates a block diagram of the various components of a crossfading EDI system in accordance with an example embodiment. On the right, interferometer 1702 receives light from the source or object (e.g., a planet orbiting a distant star). Interferometer 1702 can be, for example, a Michaelson interferometer in which the delay value can be selected. Interferometer 1702 can be operated to produce phase-stepped outputs; for example, it can be stepped through four phases at 0, 90, 180 and 270 degrees. The transmission of the interferometer 1702 can be represented as a raised cosine (1+cos( )) that is a function of wavelength or wavenumber. Spectrograph 1704 receives the output of interferometer 1704 and produces a spectrally disperse output that is captured by the detector 1706. For example, the spectra associated with the 0-, 90-, 180- and 270-degree signals can be detected and/or recorded. Processor (and/or controller) 1708 can obtain the detected spectral information from detector 1706 and perform various signal processing operations. In some embodiments, processor/controller 1708 may also control some of the operations of interferometer 1702 and/or detector 1706, which can include generating command or data signals to trigger or facilitate various operations. Processor/controller 1708 may be coupled to other components of the EDI system via wired or wireless connections. In some embodiments, any one of interferometer 1702, spectrograph 1704 and detector 1706 can include a processor and a memory that are implemented therein.

Figure 18:
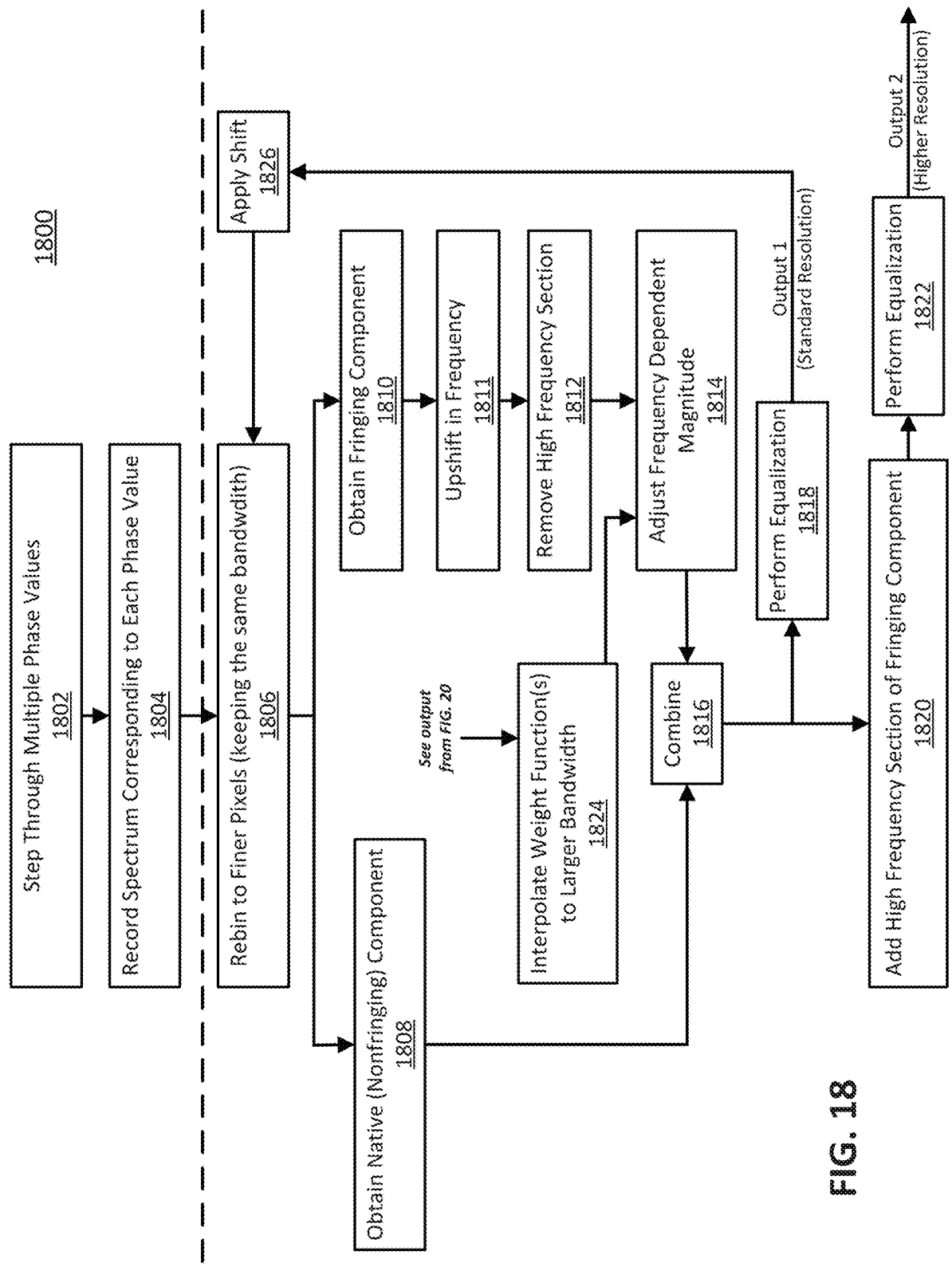
FIG. 18 illustrates a set of operations that can be carried out to obtain an output spectrum associated with a crossfading EDI system in accordance with an example embodiment.

FIG. 18 illustrate a set of operations 1800 that can be carried out to obtain an output spectrum associated with a crossfading EDI system in accordance with an example embodiment. It should be noted that some of the operations in FIG. 18 are optional, FIG. 18 may not depict all the operations that can be performed, and some of the operations may be carried out in a different order. At 1802, the interferometer is stepped through multiple phases as described earlier. At 1804, the spectrally-dispersed and phase-shifted signals are recorded; these measurements must include single-delay interferometric data. The remaining operations in FIG. 18 relate to processing of the recorded data, which may be carried out at a different time than operations 1802 and 1804.

The operations can continue to 1806, "Rebin to Finer Pixels," to interpolate the recorded spectrum and its derived components to have more pixels over the same bandwidth. This allows each pixel to be finer (smaller in wavenumber increment), and to hold the narrow features (high-frequency information) of the higher resolution output that we will create. As shown at the output of 1822, we are able to create a higher resolution output (output2 on the diagram), and having smaller (finer) pixels facilitates plotting or displaying the results. However, having finer pixels also enables both sides of the fringing peak to be shown. The fringing peak's center is typically located on the wing of the native response, and thus the high frequency side of the fringing peak is positioned even at higher frequency, and could exceed the Nyquist limit if the original pixels were used. By rebinning the pixels to be, for example, 4× smaller, the Nyquist frequency is pushed higher by 4 times, allowing all the fringing peak frequencies to be manifested. Secondly, it is easier to discern slight changes in the shape and location of the data during the iterations if there are finer pixels. Since we expect in some embodiments output2 to have 2 to 2.5 times the resolution of the native spectrograph (depending on size of the delay relative to the half width at half max (HWHM) of the native response), in some embodiments a minimum 3× finer rebinning is recommended, while in some embodiments 4× or more is preferred.

Two example methods of rebinning are the Fourier interpolation method, and the cubic spline interpolation method. The Fourier interpolation method can include the following operations: (1) take the Fourier transform; (2) add zero values to the new higher frequencies, creating new pixels with no content, so that there are approximately 2× (or any amount greater than 2×) more total pixels. Note that this does not change information content and is a reversible operation. A detail is that the zero frequency position of the Fourier transform is symmetrically in the middle and so the total number of Fourier transform points may be odd; after we add the higher frequency points we want the number to remain odd so that taking the inverse Fourier transform returns a purely real result); (3) take the inverse Fourier transform to create a purely real result that has more pixels for same bandwidth as the original.

The cubic spline interpolation method can include the following operations: (1) take the cubic spline of the data; (2) assign those splined predicted values to new more densely spaced pixels.

Operation 1826 is a shifting in wavenumber of the native and fringing spectra (described later), which is part of an iterative process that is optionally performed after a first pass through the operations has been completed.

The next operations are carried out to obtain the native component and the properly weighted fringing component. In particular, at 1808, the native (or nonfringing component) is obtained. This operation can include adding several exposures to cause the fringes to cancel and leave isolated the nonfringing component. For the example of four phase shifted signals, the operations at 1808 can include adding the four signals associated with 0-, 90-, 180- and 270-degree phase-shifted signals.

At 1810, the fringing component is obtained. This operation can include subtracting one or more exposures, expressed as a complex value having magnitude and phase. For the example of four phase shifted signals, the operations at 1810 can include obtaining $W=(S_0-S_{180})+i(S_{90}-S_{270})$, where the S represents the recorded spectrum (optionally interpolated) and the subscript represents the phase shift. The result is the fringing component (no native component).

At 1811, the content is upshifted in frequency to reverse heterodyning. The goal is to use mathematics to upshift the frequencies of the fringing component to restore them to their original high values they possessed in the input spectrum. This reverses the frequency downshifting that occurs optically in the interferometer. This allows high frequencies in the input spectrum to be detected by a spectrograph which is normally unable to detect such high frequencies (due to slit blurring for example). That is, first there is a downshifting that occurs optically in the interferometer by the multiplication of the spectrum by the interferometer sinusoidal transmission function. The optically heterodyning shifts frequencies by an amount equal to the interferometer delay (which is usually slowly wavenumber dependent due to glass dispersion). This produces a lower frequency fringing component also called a moire signal or pattern. The moire is separated from the nonfringing component by the phase stepping analysis. Then the moire is upshifted in frequency using mathematics to restore the frequencies to their original high values they possessed in the input spectrum. The mathematical shift in frequencies needs to be equal to the delay value (including any slight wavenumber dependence to it).

The success of the upshifting can be confirmed by observing that a periodic portion sometimes seen in the fringing component when observing a spectrum with a continuum, often called the "fringe comb", will be converted to a near-zero frequency (DC component) which replicates the continuum component in an input spectrum. Any slight deviations of the replicated continuum to the true continuum can be used to slightly change the delay used during the upshifting process, so that the precise effective delay vs wavenumber to use for this frequency upshifting can be determined.

An example method for implementing the frequency upshifting is to Fourier transform the fringing signal, shift it in frequency by amount of the delay, then inverse Fourier transform it back to its original wavenumber space. However, this Fourier based method suffers from a problem of when the delay corresponds to a fractional number of points in the Fourier transform, which produces an unwanted phase shift. Hence, this method may not be suitable for all applications.

Another example method which produces better results is the imaginary exponential method. In this method we do not convert the fringing component to frequency space, but instead keep it in wavenumber space and multiply the fringing component spectrum (which is complex function) by an imaginary Euler exponential that has the frequency dependent delay in its argument. The imaginary exponential is $e^{i2\pi\nu\tau(\nu)}$ where $\tau$ is a wavenumber dependent delay, and $\nu$ is the wavenumber. Then the real part is taken so that the outputted fringing component is purely real and thus can be compared or combined with the native spectrum which is purely real. This imaginary exponential method produces an accurate result even for delays that change continuously with wavenumber.

The finished real fringing component will often have the appearance of having wavelets. The frequency dependent delay argument to use in the imaginary exponential can be determined by measuring a known reference spectra with features at known wavenumbers and confirming that the upshifted fringing output has wavelets that are located consistent with the expected feature positions. Also, if the reference spectrum has a continuum portion the outputted upshifted fringing component should have a continuum portion that is similarly slowly varying in shape, and deviations between the true continuum and the frequency upshifted one can be used to adjust the detailed frequency dependence of the delay or argument used in the imaginary exponential.

Also, it may be convenient in the exponential's imaginary argument to combine the wavenumber and delay together into a wavenumber dependent phase theta, as $e^{i2\pi\nu\tau(\nu)}$ into $e^{i2\pi\theta(\nu)}$, where $\theta(\nu)$ is the phase of the periodic fringe comb produced in the fringing component when observing a perfect white light continuum as an input spectrum. (This is the interferometer sinusoidal transmission function multiplying unity). It is easy to convert or fit this sinusoidal fringing spectrum into a phase and magnitude versus wavenumber, and the phase vs. wavenumber is the aforementioned $\theta(\nu)$. This simplifies the frequency upshifting because one does not need to actually learn the precise delay or its wavenumber dependence, just use theta vs wavenumber.

In some embodiments, the determination of theta by observing a spectrum that has a continuum can be made more accurate if one filters away any narrow features, by first taking the Fourier transform, isolating the neighborhood around the expected fringe comb frequency and deleting frequencies outside this, then inverse Fourier transforming. It is also extremely useful for this theta determination to have interpolated and replotted the native and fringing spectra in wavenumbers, rather than original pixels. This removes a nonlinearity in the sinusoid and allows the Fourier transforms of sinusoidal features such as the interferometer comb to be narrow spikes instead of broad peaks and makes the isolation of the fringe comb frequency spike to be clearer.

It should be noted that the optical heterodyning process in the interferometer involves both an upshifting and downshifting in frequency, both by an amount given by the delay, but we are only interested in the downshifted component (which forms the moire patterns) since this survives recording by the spectrograph most robustly. Any upshifted component is unwanted and usually weak. However, since some small amount of upshifted can sometimes be partially resolved by spectrograph if it has very high resolution, we designed our phase stepping algorithm to cancel any optically upshifted component and only pass the optically downshifted and the native components. This is possible because under the delay increment stepping the optically upshifted and downshifted components rotate oppositely in phase so one can design phase stepping weights to produce cancellation of the optically upshifted while simultaneously constructive addition of the optically downshifted.

It should be further noted that when taking a Fourier transform of a complex wave such as the fringing signal, we produce positive and negative frequency branches, which look the same for a purely real spectrum. Depending on how one defines positive phase and hence positive frequency, it is possible that in some heterodyning reversal methods, the frequency upshifting creates a movement from right to left on the frequency axis instead of a more intuitive left to right.

The definition in this patent document is that an original narrow (high frequency) feature in the input spectrum would be on the right and positive frequency axis. Then the optical heterodyning in the interferometer shifts it to the left towards zero frequency neighborhood where it is detected as a moire signal having neighborhood of small or near-zero frequencies (of both polarities). Surprisingly, in this picture a fringe comb spike would actually have negative frequencies, at minus delay. Then the heterodyning reversal by multiplying by imaginary exponential would shift the entire moire signal from zero region to the right towards more positive frequencies. This would return the narrow feature to high frequencies on right axis, and would restore the fringe comb spike back from negative to the zero frequency position. That is, the continuum in the input spectrum was originally at zero frequency, shifted left into negative frequencies by the interferometer heterodyning, then shifted right back to zero frequency by the mathematical heterodyning reversal. It is possible to use the opposite definitions of positive and negative frequencies and the result of the data analysis, after the real part is taken, is the same.

Referring back to FIG. 18, after the upshifting operation, at 1812, the high frequency section of the fringing component is removed. As described earlier, this operation can include performing a Fourier transform, and filtering out the upper half of the fringing component's spectrum. At 1814, frequency dependent weights are strategically applied to frequency dependent magnitudes, which allows the phase shift to be canceled when combined with the nonfringing component. Operation 1814 can accept an input from operation 1824, which is an interpolation of weight functions to a larger bandwidth that is optionally performed so that the crossfading can be successfully applied over a larger bandwidth. Interpolation can include performing a Fourier transform of the region of spectrum of interest, multiplying it by interpolated weights (as a function of frequency) and then performing an inverse Fourier transform it back to wavenumber space. The input to 1824 is the frequency dependent weight ratio, and is further described in connection with FIG. 20 in Appendix B.

At 1816, the native component is combined with the adjusted fringing component obtained at 1814. In some embodiments, similar frequency dependent weights can be applied to the nonfringing component prior to addition. This optional operation, in some embodiments, can be done as an alternative to operation 1814, while in some embodiments this optional operation can be performed in addition to operation 1814. At 1818, equalization is performed, which can include modifying the signal that is output from 1816 to have a Gaussian-like profile. The output of 1818, output 1, represents the standard resolution output, which can be used for display and/or performing additional iterations. At 1820, high frequency section of the fringing component is optionally added (e.g., concatenated) to boost the resolution. This is followed by equalization, similar to 1818, which produces output 2, which is the higher resolution output.

In some embodiments, the operations further include an iterative process that uses the results obtained via an initial assessment to better estimate of the true position and shape of the spectrum. FIG. 18 illustrates the iterative operations by the arrow that connects 1818 to 1826. The iterative processing can include comparing the location of the crossfaded result with the native result to compute an estimate of Δx, which may have initially been unknown in polarity and size. Then for the next iteration, the original data of the spectrum, native and fringing, are shifted in wavenumber to better improve the final position and shape of the spectrum, using that last new estimate for Δx. As a result, a more accurate version of the spectrum's wavenumber position and shape. According to some example embodiments, equalization is applied after each iteration to make locating a feature's position more accurate, since then it is not confused by ringing from neighboring features. Without equalization, ringing might arise from the sharp edge cutoff of frequencies at the delay value from step 1812, where the magnitude can suddenly drop to zero.

Figure 19:
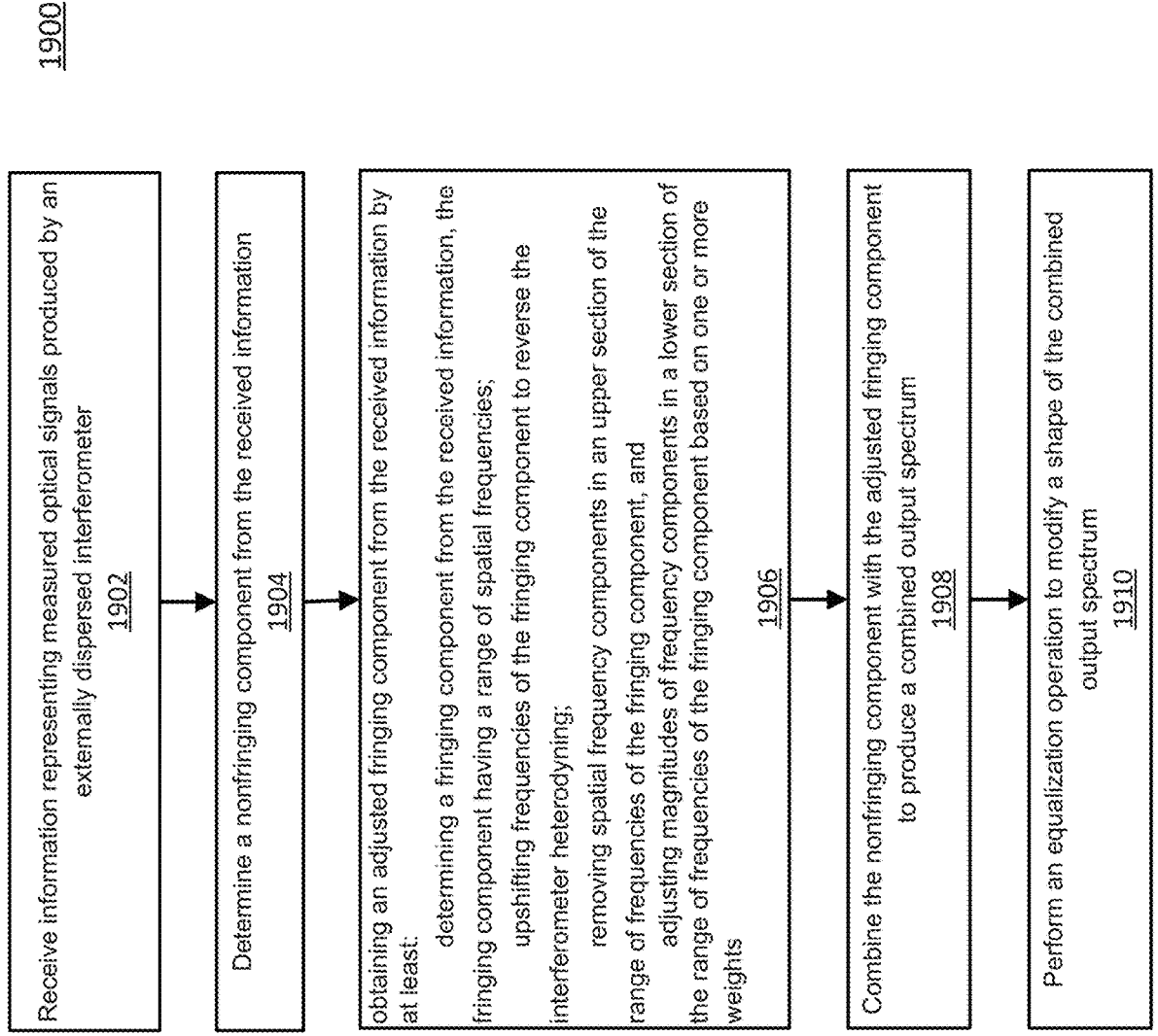
FIG. 19 illustrates a set of operations that can be carried out to obtain spectral characteristics of an optical signal in accordance with an example embodiment.

FIG. 19 illustrates a set of operations 1900 that can be carried out to obtain spectral characteristics of an optical signal in accordance with an example embodiment. At 1902, information representing measured optical signals produced by an externally dispersed interferometer is received. At 1904, a nonfringing component is determined from the received information. At 1906, an adjusted fringing component is obtained from the received information by at least: (a) determining a fringing component from the received information, where the fringing component has a range of spatial frequencies; (b) upshifting frequencies of the fringing component to reverse the interferometer heterodyning; (c) removing spatial frequency components in an upper section of the range of frequencies of the fringing component, and (d) adjusting magnitudes of frequency components in a lower section of the range of frequencies of the fringing component based on one or more weights. At 1908, the nonfringing component is combined with the adjusted fringing component to produce a combined output spectrum. At 1910, an equalization operation is performed to modify a shape of the combined output spectrum.

In one example embodiment, determining the nonfringing component includes adding a plurality of signals contained in the received information associated with a plurality of phase shifts. For example, adding the plurality of signals includes adding signals that correspond to a zero-degree, a 90-degree, a 180-degree and a 270-degree phase shift. In another example embodiment, determining the fringing component includes subtracting one or more signals associated with one or more phase shifts from one or more additional signals associated with one or more additional phase shifts. For example, subtracting the one or more signals includes: subtracting a signal that corresponds to a 180-degree phase shift from a signal that corresponds to a zero-degree phase shift, and subtracting a signal that corresponds to a 270-degree phase shift from a signal that corresponds to a 90-degree phase shift. In yet another example embodiment, removing the frequency components comprises filtering out frequencies in the upper half of the range of frequencies.

According to some embodiments, the nonfringing component is a representative of the interferometer's spectral response, spectral contents of the fringing component and the nonfringing component overlap, and a separation between a peak of the fringing component and a peak of the nonfringing component is equal to a delay implemented in the interferometer. In an example embodiment, a contribution of the nonfringing component to the combined output spectrum is substantially zero at a spectral location of the peak of the fringing component. In another example embodiment, the adjusted fringing component is a counteracting component against the fringing component's movements due to an insult, thereby enabling correction of errors in the measured optical signals due to the insult.

In one example embodiment, adjusting the magnitudes of the frequency components in the lower section of the range of frequencies includes determining a set of weights as a function of frequency such that upon combination of the nonfringing component with the adjusted fringing component, the combined output spectrum has a substantially zero phase up to a spatial frequency that corresponds to a delay implemented in the interferometer. In this embodiment adjusting the magnitudes of the frequency components in the lower section of the range of frequencies also includes applying the determined weights to the frequency components in the lower section of the range frequencies.

In another example embodiment, the equalization operation modifies the shape of the combined output spectrum to resemble a Gaussian profile. In yet another example embodiment, the operations further include, prior to performing the equalization operation, adding the frequency components in the upper section of the range of frequencies to obtain a boost in resolution. In still another example embodiment, the operations further include (a) determining an estimate of an insult associated the interferometer measurements, (b) using the estimate of the insult to conduct a further determination of the nonfringing component and the adjusted fringing component; and (c) obtaining a revised combined output spectrum. In another example embodiment, the operations further include repeating operations (a) through (c) a plurality of times. In yet another example embodiment, the operations further include producing interpolated weights obtained from a first spectral region and applying the interpolated weights to a second spectral region that is larger than the first spectral region after determining the nonfringing and the fringing components. In the above embodiments, the frequencies can be a function of wavenumbers. In one example embodiment, upshifting frequencies of the fringing component includes, in wavenumber space, multiplying the fringing component spectrum by an imaginary Euler exponential that includes a frequency dependent delay, obtaining a real part of a resulting product for combination or comparison with the non-fringing component.

Another aspect of the disclosed embodiments relates to an externally dispersed interferometric system that includes an interferometer configured to receive light from an object, the interferometer having a single fixed-valued delay, a spectrograph positioned to receive optical signals output from the interferometer and to produce spectrally dispersed optical signals, a detector positioned to receive the spectrally dispersed optical signals from the spectrograph and to produce information representing signals detected thereon, and a processor and a memory including instructions that are stored thereon. The instructions when executed by the processor configure the processor to: receive information representing measured optical signals produced by the detector, determine a nonfringing component from the received information, obtain an adjusted fringing component from the received information by at least: determining a fringing component from the received information, where the fringing component has a range of frequencies; upshifting frequencies of the fringing component to reverse the interferometer heterodyning; removing frequency components in an upper section of the range of frequencies of the fringing component; and adjusting magnitudes of frequency components in a lower section of the range of frequencies of the fringing component based on one or more weights. The instructions when executed by the processor also configure the processor to combine the nonfringing component with the adjusted fringing component to produce a combined output spectrum, and to perform an equalization operation to modify a shape of the combined output spectrum.

In one example embodiment, the instructions when executed by the processor configure the processor to determine the nonfringing component by operations that include adding a plurality of signals contained in the received information associated with a plurality of phase shifts, and determine the fringing component by operations that include subtracting one or more signals associated with one or more phase shifts from one or more additional signals associated with one or more additional phase shifts. In another example embodiment, the nonfringing component is representative of the interferometer's spectral response, spectral contents of the fringing component and the nonfringing component overlap, and a separation between a peak of the fringing component and a peak of the nonfringing component is equal to a delay implemented in the interferometer.

In yet another example embodiment, adjusting the magnitudes of the frequency components in the lower section of the range of frequencies includes: determining a set of weights as a function of frequency such that upon combination of the nonfringing component with the adjusted fringing component, the combined output spectrum has a substantially zero phase up to a spatial frequency that corresponds to a delay implemented in the interferometer, and applying the determined weights to the frequency components in the lower section of the range frequencies.

In one example embodiment, the instructions when executed by the processor further configure the processor to, prior to performing the equalization operation, add the frequency components in the upper section of the range of frequencies to obtain a boost in resolution. In another example embodiment, the instructions when executed by the processor further configure the processor to: (a) determine an estimate of an insult associated the interferometer measurements, (b) use the estimate of the insult to conduct a further determination of the nonfringing component and the adjusted fringing component; and (c) obtain a revised combined output spectrum. In still another example embodiment, the instructions when executed by the processor further configure the processor to produce interpolated weights obtained from a first spectral region and apply the interpolated weights to a second spectral region that is larger than the first spectral region subsequent to determining the nonfringing and the fringing components.

It is understood that the various disclosed embodiments may be implemented individually, or collectively, in devices comprised of various optical components, electronics hardware and/or software modules and components. One example device can comprise at least one processor and/or controller, at least one memory unit that is in communication with the processor, and at least one communication unit that enables the exchange of data and information, directly or indirectly, through the communication link with other entities, devices, databases and networks. The communication unit may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The device may be integrated as part of any disclosed devices or components to carry out any of the disclosed methods, to carry out various computations, or to control the operation of various components disclosed herein.

Various information and data processing operations described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. While operations are depicted in the drawings in a particular order, this should not be understood as requiring that such operations be performed in the particular order shown or in sequential order, or that all illustrated operations be performed, to achieve desirable results. The features of the embodiments described herein may be combined in all possible combinations of methods, apparatus, modules, and systems.

Appendix A—Application Over a Wide Bandwidth

Figure 3:
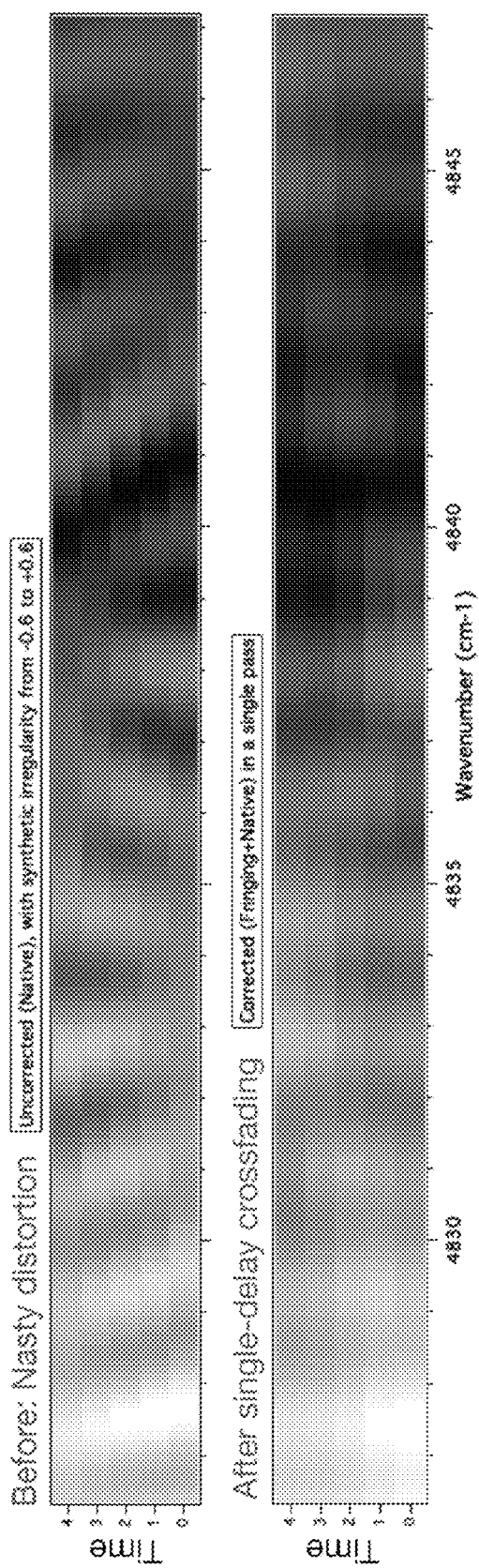
FIG. 3 illustrates synthetic data designed to simulate irregular bipolar drift and the corrections obtained by the applying the disclosed single-delay crossfaded techniques.

FIG. 3 shows that crossfading can be successfully applied over a bandwidth at least 20 cm$^{-1}$ wide, which is much wider than a single resolution element (about 2 cm$^{-1}$). This is done by using the same crossfading weight vs. frequency function $k(\rho)$ that is found from the behavior of a single resolution element, and apply it to the entire band segment in question. In the description that follows, we will use k to designate weights.

The $f_{out}(\rho)$ is the Fourier Transform (FT) of the EDI output spectrum (prior to equalization) is given by:

$$f_{out}(\rho) = k(\rho) f_E(\rho) + f_{NF}(\rho)$$

where $f_E(\rho)$ is the FT of the EDI wavelet signal Wav(v), and $f_{NF}(\rho)$ is the FT of the native spectrum vs. v.

The wavelet signal is the moiré signal upshifted in frequency to restore the signals to the original values in the input spectrum. This is done by multiplication by a phasor having a frequency set by the interferometer delay τ.

We deliberately calculate $k(\rho)$ over the smallest practical region of v-space (the resolution element) to minimize the number of points that need to be calculated, for simplicity. But after we calculate $k(\rho)$, we apply it to a bandwidth that is much larger than a resolution element, so the number of points in the segment will be many times that used to calculate the weights.

When the number of points in a band segment increases, it also increases the number of point in its Fourier transform, which is what gets multiplied by $k(\rho)$. This makes the frequency (ρ) bins much finer than the ones in the weight function $k(\rho)$. We find that it works to interpolate between the coarse points of $k(\rho)$ to evaluate it for each fine frequency point.

For extremely wide band segments, it would be beneficial to evaluate whether the spectrograph response function changes significantly over that segment. If so, it would be advantageous to subdivide the segment into smaller segments that has individually calculated crossfading weighting for each.

Appendix B—How to Calculate the Crossfading Weights

The description herein describes an example procedure on how to calculate the crossfading weightings, such as those that can be provided to operation 1824 of FIG. 18.

Figure 20:
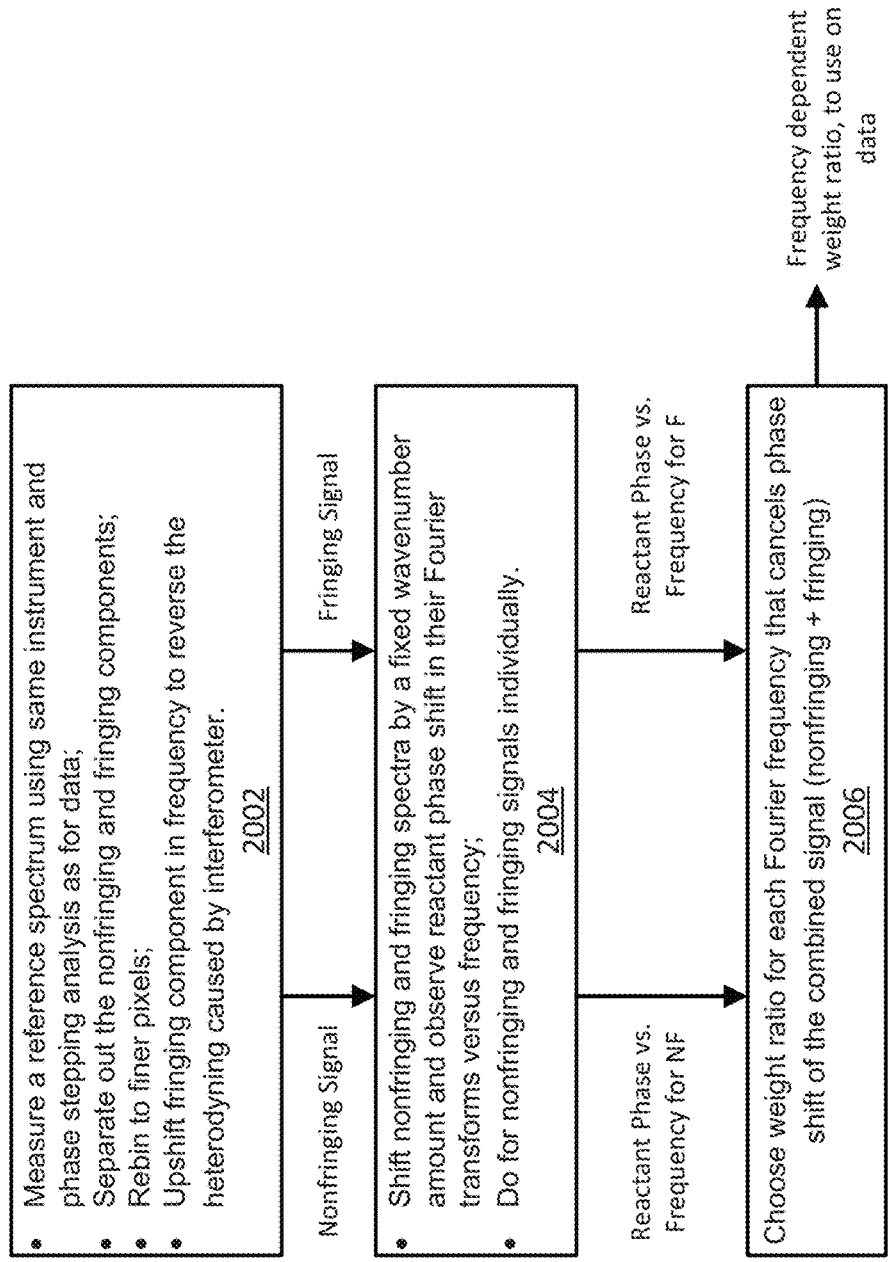
FIG. 20 illustrates a set of operations that can be carried out to generate frequency dependent weight ratios in accordance with an example embodiment.

FIG. 20 illustrates a set of operations 2000 that can be carried out to generate frequency dependent weight ratios in accordance with an example embodiment. At 2002, a series of operations are performed that include using the same instrument and data analysis that was used for measuring data to measure a known reference spectrum. Ideally, this occurs simultaneously or contemporaneously with measuring the data so that whatever lineshape (native response) the spectrograph has for the data, it also has for the reference spectrum. This can be done, for example, by having the reference spectra on nearby the data spectra but on separate detector pixel rows. The reference spectra typically includes narrow spectral lines of a spectral lamp with known wavenumber positions measured by others. The bandwidth for measuring the reference spectral line can be very narrow and just surround a given spectral lamp line. This minimizes the number of discrete frequencies in the Fourier transform and hence minimizes the number of independent weights we need to choose, which simplifies the analysis. Ideally there is just a single narrow feature inside the bandwidth not having another satellite feature accidentally enclosed.

As part of operations in 2002, the fringing and nonfringing components are separated, rebinning operation is performed to produce finer pixels, and upshifting is performed to reverse heterodyning effects (as described earlier).

Figure 14:
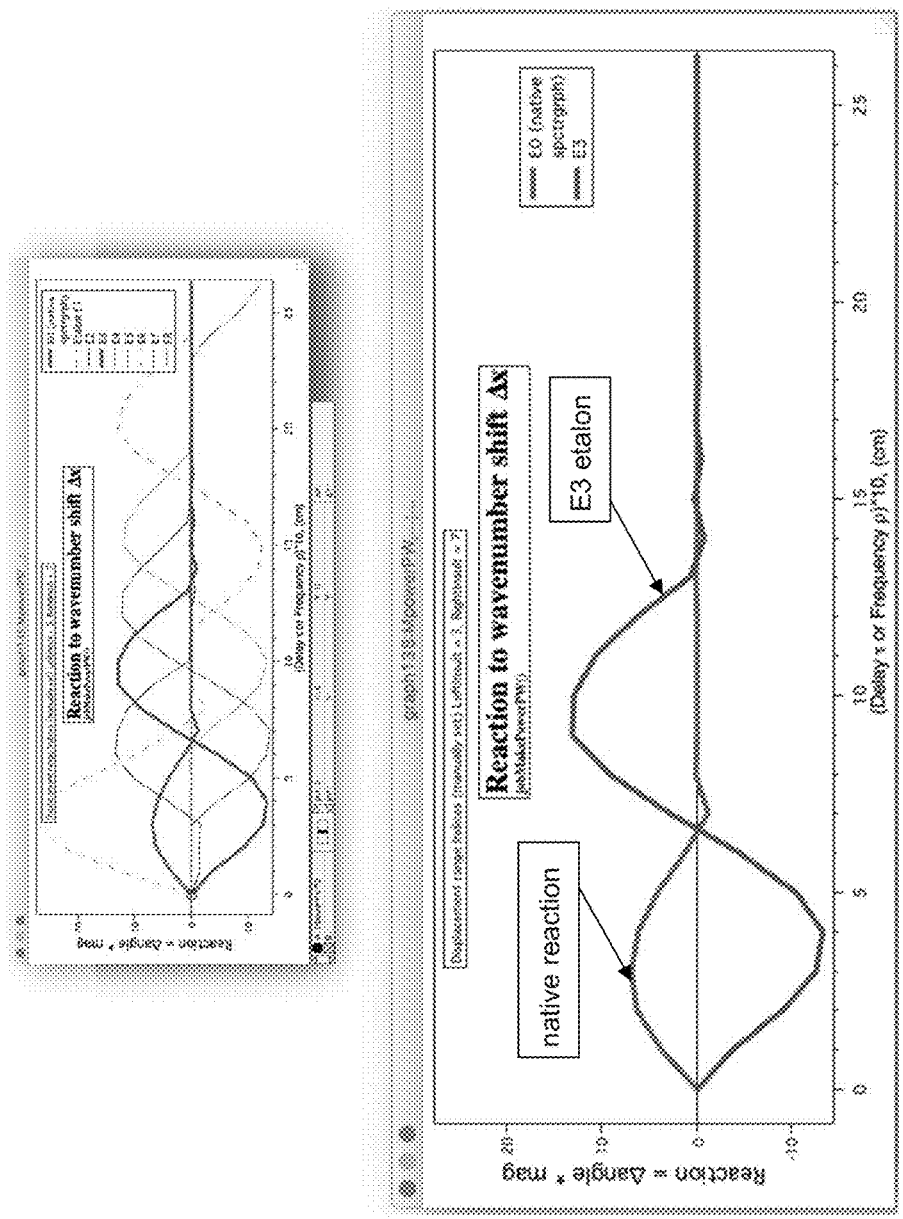
FIG. 14 illustrates computed reactions of an EDI system to an insult for different delay values.

As part of 2004, frequency dependent reaction curves for both nonfringing (NF) and fringing (F) signals are generated (see, for example those shown in FIG. 14, where the NF is labeled as "native" and the F is labeled as "E3"). We discover how large is the reaction of individual NF and F component Fourier transforms versus frequency to a deliberate wavenumber drift (insult $\Delta x$) of the reference spectrum. We deliberately shift the reference spectra NF and F components mathematically by a fixed wavenumber amount, $\Delta x$, and observe the shift in the complex value in their Fourier transforms in unweighted output spectra, for each Fourier frequency, and in the perpendicular direction to its original direction. $\Delta x$ here is a test amount of insult shift, which could be a typical expected amount or perhaps a maximum expected amount. When $\Delta x$ is small, so that the angular shift is small compared to one radian, the small angle approximation to the sine function is reasonable to use. In this case, the reaction in the perpendicular direction is approximately the change in phase angle (in radians) multiplied by the magnitude of the Fourier transform at each frequency. For the fringing signal this will create an "S" like reaction curve vs. frequency, which goes through zero at a frequency equal to the interferometer delay, and goes nonzero for lower frequencies than the delay, and opposite phase for higher frequencies than the delay frequency. The shape for the nonfringing reaction signal will more likely be a peak (not a complete "S"), since effectively the delay is zero for the nonfringing signal, so the zero crossing point of the "S" shape is at zero frequency. These will change shape if the spectrograph lineshape changes. Hence it is optimal if the reference spectra is measured simultaneously with the data.

At 2006, using the two phase reaction curves, for each frequency, we combine the nonfringing and fringing sensitivities after we apply multiplicative weights to at least one of them or both of them. A default weight of unity is assumed if unweighted. We adjust the weight ratio until the combined reaction is zero, while still having a nonzero average weight. This is the desired ratio we output at 2006, finding a ratio for each frequency. For frequencies between zero and the delay, the NF and F reactant phases will be opposite in polarity ("in opposition"), and we can cancel them for a positive weight ratio and the NF and F magnitudes will add and form a strong net signal. This is the desirable situation. For frequencies above the delay the reactant, phases will have the same polarity and it is not possible to cancel them for positive weight ratios. Negative weight ratios are undesirable since they reduce the net magnitude of the signal allowing it to be noisier. Hence frequencies above the delay are not used for the basic crossfading of a single delay (but can be used later during step 1820 (in FIG. 18) to extend the frequency range above the delay).

These optimal weight ratios, frequency dependent, are outputted at 2006 and can be sent to FIG. 18 where they can be applied to the data.

For larger insults, $\Delta x$ values with a larger angular phase shift that approaches one radian, the actual complex vector sum of the nonfringing and fringing Fourier transforms (at the given frequency) should be used to give a more accurate result, as shown in example FIG. 15, where the circles labeled "lower delay" could represent the native nonfringing Fourier transform complex value, and the squares labeled "higher delay" could represent the single-delay fringing Fourier transform complex value, both of them evaluated for a frequency, $\rho$, of "17" which means 1.7 cm. The vector sum of the nonfringing and fringing vectors is displayed as a black vector (open diamond). The vectors sums are evaluated for at least two configurations: (a) $\Delta x$ is zero (labeled by "0"), and (b) a nonzero amount of $\Delta x$ (labeled as "0.5") similar in value to the largest expected insult (FIG. 15 also shows a third configuration when the polarity of $\Delta x$ is flipped from 0.5 to −0.5). The goal of this step is to pick a weight ratio (for each frequency) that causes the complex sum vector (NF plus F) to change the least amount of phase angle between the two (or three) configurations, as indicated by the angles of the black diamond "0" and angles of black diamonds "0.5" or "−0.5". Note that the "0.5" and "−0.5" diamonds fall on the same line between the "0" diamond and the origin, indicating that the complex phase angle does not change significantly even though the reference spectrum is being shifted in wavenumber from delta X of −0.5 to 0 to +0.5, in wavenumber units 1/cm. When this condition of minimal or zero phase angle change occurs for each Fourier frequency, then robustness to insult delta X ("stability") is achieved for the reference spectrum test case. And when these weight ratios are also applied to the measurement of a data spectrum, a similar robustness to insult delta X is expected.

I claim:

1. A method for improving spectrograph results obtained by an externally dispersed interferometer, the method comprising:
   receiving information representing measured optical signals produced by the externally dispersed interferometer;
   determining a nonfringing component from the received information;
   obtaining an adjusted fringing component from the received information by at least:
      determining a fringing component from the received information, the fringing component having a range of frequencies;
      upshifting frequencies of the fringing component to reverse an interferometer heterodyning;
      removing frequency components in an upper section of the range of frequencies of the fringing component, and
      adjusting magnitudes of frequency components in a lower section of the range of frequencies of the fringing component based on one or more weights;
   combining the nonfringing component with the adjusted fringing component to produce a combined output spectrum; and
   performing an equalization operation to modify a shape of the combined output spectrum to produce an improved output spectrum with improved tolerance to wavelength shifts or distortions compared to output spectra obtained solely based on the received information representing the measured optical signals produced by the externally dispersed interferometer.

2. The method of claim 1, wherein determining the nonfringing component includes adding a plurality of signals contained in the received information associated with a plurality of phase shifts.

3. The method of claim 2, wherein adding the plurality of signals includes adding signals that correspond to a zero-degree, a 90-degree, a 180-degree and a 270-degree phase shift.

4. The method of claim 1, wherein determining the fringing component includes subtracting one or more signals associated with one or more phase shifts from one or more additional signals associated with one or more additional phase shifts.

5. The method of claim 4, wherein subtracting the one or more signals includes:
subtracting a first signal that corresponds to a 180-degree phase shift from a second signal that corresponds to a zero-degree phase shift, and
subtracting a third signal that corresponds to a 270-degree phase shift from a fourth signal that corresponds to a 90-degree phase shift.

6. The method of claim 1, wherein removing the frequency components comprises filtering out frequencies in an upper half of the range of frequencies.

7. The method of claim 1, wherein:
the nonfringing component is a representative of interferometer's spectral response,
spectral contents of the fringing component and the nonfringing component overlap, and
a separation between a peak of the fringing component and a peak of the nonfringing component is equal to a delay implemented in the interferometer.

8. The method of claim 7, wherein a contribution of the nonfringing component to the combined output spectrum is substantially zero at a spectral location of the peak of the fringing component.

9. The method of claim 1, wherein the adjusted fringing component is a counteracting component against the fringing component's movements due to an insult, thereby enabling correction of errors in the measured optical signals due to the insult.

10. The method of claim 1, wherein adjusting the magnitudes of the frequency components in the lower section of the range of frequencies includes:
determining a set of weights as a function of frequency such that upon combination of the nonfringing component with the adjusted fringing component, the combined output spectrum has a substantially zero phase up to a frequency that corresponds to a delay implemented in the interferometer, and
applying the determined weights to the frequency components in the lower section of the range frequencies.

11. The method of claim 1, wherein the equalization operation modifies the shape of the combined output spectrum to resemble a Gaussian profile.

12. The method of claim 1, further comprising, prior to performing the equalization operation, adding the frequency components in the upper section of the range of frequencies to obtain a boost in resolution.

13. The method of claim 1, further comprising:
(a) determining an estimate of the insult associated interferometer measurements,
(b) using the estimate of the insult to conduct a further determination of the nonfringing component and the adjusted fringing component; and
(c) obtaining a revised combined output spectrum.

14. The method of claim 13, further comprising repeating operations (a) through (c) a plurality of times.

15. The method of claim 1, further comprising producing interpolated weights obtained from a first spectral region and applying the interpolated weights to a second spectral region that is larger than the first spectral region after determining the nonfringing and the fringing components.

16. The method of claim 1, wherein the frequencies are a function of wavenumbers.

17. The method of claim 1, wherein upshifting frequencies of the fringing component includes, in wavenumber space, multiplying the fringing component spectrum by an imaginary Euler exponential that includes a frequency dependent delay, obtaining a real part of a resulting product for combination or comparison with the nonfringing component.

18. An externally dispersed interferometric system, comprising:
an interferometer configured to receive light from an object, the interferometer having a single fixed-valued delay;
a spectrograph positioned to receive optical signals output from the interferometer and to produce spectrally dispersed optical signals;
a detector positioned to receive the spectrally dispersed optical signals from the spectrograph and to produce information representing signals detected thereon; and
a processor and a memory including instructions that are stored thereon, wherein the instructions when executed by the processor configure the processor to:
receive information representing measured optical signals produced by the detector,
determine a nonfringing component from the received information,
obtain an adjusted fringing component from the received information by at least:
determining a fringing component from the received information, the fringing component having a range of frequencies;
upshifting frequencies of the fringing component to reverse an interferometer heterodyning;
removing spatial frequency components in an upper section of the range of frequencies of the fringing component, and
adjusting magnitudes of frequency components in a lower section of the range of frequencies of the fringing component based on one or more weights;
combine the nonfringing component with the adjusted fringing component to produce a combined output spectrum; and
perform an equalization operation to modify a shape of the combined output spectrum to produce an improved output spectrum with improved tolerance to wavelength shifts or distortions compared to an output spectrum obtained solely based on the received information representing the measured optical signals produced by the detector.

19. The system of claim 18, wherein the instructions when executed by the processor configure the processor to determine the nonfringing component by operations that include adding a plurality of signals contained in the received information associated with a plurality of phase shifts, and determine the fringing component by operations that include subtracting one or more signals associated with one or more phase shifts from one or more additional signals associated with one or more additional phase shifts.

20. The system of claim 18, wherein:
   the nonfringing component is a representative of interferometer's spectral response,
   spectral contents of the fringing component and the nonfringing component overlap, and
   a separation between a peak of the fringing component and a peak of the nonfringing component is equal to a delay implemented in the interferometer.

21. The system of claim 18, wherein adjusting the magnitudes of the frequency components in the lower section of the range of frequencies includes:
   determining a set of weights as a function of frequency such that upon combination of the nonfringing component with the adjusted fringing component, the combined output spectrum has a substantially zero phase up to a frequency that corresponds to the delay implemented in the interferometer, and
   applying the determined weights to the frequency components in the lower section of the range frequencies.

22. The system of claim 18, wherein the instructions when executed by the processor further configure the processor to, prior to performing the equalization operation, add the frequency components in the upper section of the range of frequencies to obtain a boost in resolution.

23. The system of claim 18, wherein the instructions when executed by the processor further configure the processor to:
   (a) determine an estimate of an insult associated interferometer measurements,
   (b) use the estimate of the insult to conduct a further determination of the nonfringing component and the adjusted fringing component; and
   (c) obtain a revised combined output spectrum.

24. The system of claim 18, wherein the instructions when executed by the processor further configure the processor to produce interpolated weights obtained from a first spectral region and apply the interpolated weights to a second spectral region that is larger than the first spectral region after determining the nonfringing and the fringing components.

* * * * *